US012500900B1

(12) United States Patent
McCubbin et al.

(10) Patent No.: US 12,500,900 B1
(45) Date of Patent: Dec. 16, 2025

(54) SECURITY ALERT META-ANALYSIS FOR IDENTIFYING CAUSALLY RELATED EVIDENCE OF CYBERATTACKS

(71) Applicant: Amazon Technologies, Inc., Seattle, WA (US)

(72) Inventors: Christopher B McCubbin, Amherst, MA (US); Ruslan Vaulin, Holliston, MA (US); Michael Buciuman-Coman, Lexington, MA (US); Keith J Gilbert, Enfield, NH (US); Andrew Gorelik, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 254 days.

(21) Appl. No.: 17/809,519

(22) Filed: Jun. 28, 2022

(51) Int. Cl.
*H04L 9/40* (2022.01)

(52) U.S. Cl.
CPC ...... *H04L 63/1416* (2013.01); *H04L 63/1433* (2013.01); *H04L 63/1441* (2013.01)

(58) Field of Classification Search
CPC ... H04L 63/20; H04L 63/145; H04L 63/1408; H04L 63/1416; H04L 63/1425; H04L 63/1433; H04L 63/1441; H04L 9/002; H04L 9/40; H04L 41/16; H04L 43/045; G06F 17/30958; G06N 20/00
USPC .......................................................... 726/23
See application file for complete search history.

(56) References Cited

U.S. PATENT DOCUMENTS

| | | | | |
|---|---|---|---|---|
| 9,438,618 B1 * | 9/2016 | Sultan | ...................... | G06F 21/53 |
| 9,525,696 B2 * | 12/2016 | Kapoor | ............... | G06F 16/2358 |
| 9,679,125 B2 * | 6/2017 | Bailor | ................... | G06F 21/316 |
| 9,699,205 B2 * | 7/2017 | Muddu | ................... | H04L 41/22 |
| 10,148,686 B2 * | 12/2018 | Hassanzadeh | ...... | H04L 63/1441 |
| 10,536,472 B2 * | 1/2020 | Jang | ....................... | G06N 5/022 |
| 10,601,640 B1 * | 3/2020 | Das | ..................... | H04L 41/0636 |

(Continued)

OTHER PUBLICATIONS

Fire Eye Inc., "The Business Case for Protecting Against Advanced Attacks", https://www2.fireeye.com/StopTheNoise-IDC-Numbers-Game-Special-Report.html., dated 2014, pp. 1-13.

(Continued)

*Primary Examiner* — James N Fiorillo

(74) *Attorney, Agent, or Firm* — Robert C. Kowert; Kowert, Hood, Munyon, Rankin & Goetzel, P.C.

(57) ABSTRACT

A security alert meta-analysis (SAMA) system is disclosed capable of identifying causally related evidence of a cyberattack in a computing environment. In embodiments, the system builds a security data graph from security alerts generated by other security monitoring services. The security data graph links related entities (e.g. users and resources) in the computing environment and the entities to their associated security alerts. Edges in the graph are filtered based on edge weights to identify sub-graphs that represent clusters of causally related evidence probative of attacks. The evidence clusters are presented to analysts to be investigated further. In embodiments, the meta-analysis process is implemented as periodic jobs executed on a cluster of worker nodes. Advantageously, the disclosed system is able to filter through large volumes of alerts to reduce false positives, and group related alerts, possibly from different monitoring services, so that they can be investigated together.

20 Claims, 13 Drawing Sheets

(56) References Cited

U.S. PATENT DOCUMENTS

| | | | | |
|---|---|---|---|---|
| 2011/0195729 | A1* | 8/2011 | Amoroso | H04L 63/145 455/466 |
| 2014/0090056 | A1* | 3/2014 | Manadhata | H04L 63/1416 726/22 |
| 2014/0304399 | A1* | 10/2014 | Chaudhary | G06F 11/3093 709/224 |
| 2017/0063896 | A1* | 3/2017 | Muddu | H04L 63/1433 |
| 2018/0084001 | A1* | 3/2018 | Hudis | H04L 63/1408 |
| 2018/0367548 | A1* | 12/2018 | Stokes, III | H04L 63/1416 |
| 2020/0137029 | A1* | 4/2020 | Sakthievel | H04L 43/045 |
| 2020/0296124 | A1* | 9/2020 | Pratt | H04L 63/20 |
| 2020/0358804 | A1* | 11/2020 | Crabtree | H04L 63/102 |
| 2021/0126938 | A1* | 4/2021 | Trost | G06F 21/552 |
| 2021/0248443 | A1* | 8/2021 | Shu | H04L 63/1416 |
| 2022/0210202 | A1* | 6/2022 | Crabtree | G06F 16/2477 |
| 2022/0224721 | A1* | 7/2022 | Bertiger | H04L 41/0681 |
| 2022/0292186 | A1* | 9/2022 | Givental | G06F 21/554 |
| 2023/0076372 | A1* | 3/2023 | Engelberg | G06F 21/577 |
| 2023/0114821 | A1* | 4/2023 | Thomas | H04L 63/1433 726/23 |
| 2023/0259632 | A1* | 8/2023 | Marciano | G06F 21/554 726/25 |
| 2023/0275912 | A1* | 8/2023 | Shahul Hameed | H04L 41/16 726/23 |
| 2023/0283621 | A1* | 9/2023 | Techentin | G06F 21/55 726/23 |

OTHER PUBLICATIONS

S. Mathew, D. Britt, R. Giomundo, S. Upadhyaya, M. Sudit, and A. Stotz. Realtime multistage attack awareness through enhanced intrusion alert clustering. In MILCOM 2005-2005 IEEE Military Communications Conference, vol. 3, pp. 1801-1806, Oct. 2005.

S. Mathew, C. Shah, and S. Upadhyaya. An alert fusion framework for situation awareness of coordinated multistage attacks. In Third IEEE International Workshop on Information Assurance (IWIA'05), pp. 95-104, Mar. 2005.

Wajih Ul Hassan, Shengjian Guo, Ding Li, Zhengzhang Chen, Kangkook Jee, Zhichun Li, and Adam Bates. Nodoze: Combatting threat alert fatigue with automated provenance triage. In NDSS, 2019.

Steven Noel, Eric Harley, Kam Him Tam, and Greg Gyor. Big-data architecture for cyber attack graphs representing security relationships in nosql graph databases. 2014.

S. Noel, P. D. Rowe, S. Purdy, M. Limiero, T. Lu, and W. Mathews. Missionfocused cyber situational understanding via graph analytics. In 2018 10th International Conference on Cyber Conflict (CyCon), pp. 427-448, 2018.

Wikipedia contributors. Sqrrl—Wikipedia, the free encyclopedia. https://en.wikipedia.org/w/index.php?title=Sqrrl&oldid=899580655, 2022.

Wikipedia contributors. Birthday problem—Wikipedia, the free encyclopedia. https://en.wikipedia.org/w/index.php?title=Birthday_problem&oldid=912594355, 2022.

Matei Zaharia, Reynold S. Xin, PatrickWendell, Tathagata Das, Michael Armbrust, Ankur Dave, Xiangrui Meng, Josh Rosen, Shivaram Venkataraman, Michael J. Franklin, Ali Ghodsi, Joseph Gonzalez, Scott Shenker, and Ion Stoica. Apache spark: A unified engine for big data processing. Commun. ACM, 59(11):56-65, Oct. 2016.

Joseph E. Gonzalez, Reynold S. Xin, Ankur Dave, Daniel Crankshaw, Michael J. Franklin, and Ion Stoica. Graphx: Graph processing in a distributed dataflow framework. In Proceedings of the 11th USENIX Conference on Operating Systems Design and Implementation, OSDI'14, pp. 599-613, Berkeley, CA, USA, 2014. USENIX Association.

Quissem Ben Fredj. A realistic graph-based alert correlation system. Security and Communication Networks, 8(15):2477-2493, 2015.

* cited by examiner

610

Cyberattack Evidence Clusters Daily Report – May 31, 2022

Total Evidence Clusters: 15
Continued From Previous Day: 2
Largest Cluster Size: 12 – Possible attack of web server
Most Critical Alerts: 9 – 2022-05-31-ABC-Alert-579
Longest Pending: 5 days – Possible attack of web server report summary 620

| Evidence Cluster | Accounts / Resources Involved | First Observed | Last Change | Alerts | Risk Score | Analyst(s) | Status |
|---|---|---|---|---|---|---|---|
| 2022-05-31-ABC-Alert-579 | 3 accounts 5 resources | 03:33:44 | 10:15:44 | 20 total 9 critical | 90 | | Need to Investigate |
| 2022-05-31-EFG-Alert-9ab | 2 accounts 1 server | 02:33:44 | 3:45:23 | 3 total | 55 | Bob | No Action |
| Possible attack of web server | 1 server 11 external IPs | 2022-05-26 | 10:41:48 | 16 total 4 critical | 90 | David | Monitoring |
| Suspicious activity off hours | 1 account 1 workstation | 2022-05-27 | 2022-05-29 | 4 total | 65 | Gabe | Monitoring | evidence cluster listing 630

[Sort 632] [Filter 634] [Investigate 636]

Cyberattack Evidence Clusters Daily Report – May 31, 2022

Total Evidence Clusters: 15
Continued From Previous Day: 2
Largest Cluster Size: 12 – Possible attack of web server
Most Critical Alerts: 9 – <u>2022-05-31-ABC-Alert-579</u>
Longest Pending: 5 days – Possible attack of web server

*report summary 620*

| Evidence Cluster | Accounts / Resources Involved | First Observed | Last Change | Alerts | Risk Score | Analyst(s) | Status |
|---|---|---|---|---|---|---|---|
| <u>2022-05-31-ABC-Alert-579</u> | 3 accounts<br>5 resources | 03:33:44 | 10:15:44 | <u>20 total</u><br><u>9 critical</u> | 90 | | Need to Investigate |
| 2022-05-31-EFG-Ale... | | | 3:45:23 | 3 total | 55 | <u>Bob</u> | No Action |
| Possible attack of server | | | 10:41:48 | <u>16 total</u><br><u>4 critical</u> | 90 | <u>David</u> | Monitoring |
| Suspicious activi... hours | | | 2022-05-29 | 4 total | 65 | <u>Gabe</u> | Monitoring |

*640*
DevOps (<u>aaa@xyz.com</u>)
Payroll (<u>ccc@xyz.com</u>)
Finance (<u>ggg@xyz.com</u>)
HR database server (<u>49.59.111.222</u>)
Payroll workstation (<u>49.59.101.42</u>)
Payroll workstation (<u>49.59.101.36</u>)
Company directory (<u>49.59.33.201</u>)
DevOps workstation (<u>49.59.66.77</u>)

Sort 632    Filter 634    Investigate 636

Cyberattack Evidence Clusters Daily Report – May 31, 2022

| Total Evidence Clusters: | 15 |
|---|---|
| Continued From Previous Day: | 2 |
| Largest Cluster Size: | 12 – Possible attack of web server |
| Most Critical Alerts: | 9 – <u>2022-05-31-ABC-Alert-579</u> |
| Longest Pending: | 5 days – Possible attack of web server |

*report summary 620*

| Evidence Cluster | Accounts / Resources Involved | First Observed | Last Change | Alerts | Risk Score | Analyst(s) | Status |
|---|---|---|---|---|---|---|---|
| <u>2022-05-31-ABC-Alert-579</u> | <u>3 accounts</u><br><u>5 resources</u> | 03:33:44 | 10:15:44 | <u>20 total</u><br><u>9 crit</u> | 90 | | Need to Investigate |
| 2022-05-31-EFG-Alert-9ab | 2 accounts<br>1 server | 02:33:44 | | | | | No Action |
| Possible attack of web server | 1 server<br>12 external IPs | 2022-05-26 | | | | | Monitoring |
| <u>Suspicious activity off hours</u> | 1 account<br>1 workstation | 2022-05-27 | | | | | Monitoring |

*evidence cluster listing 630*

Unusual login on DevOps workstation (3:48:44)
Unusual login on DevOps workstation (3:50:23)
Repeated querying of company directory (4:01:12)
New login at payroll workstation (4:30:33)
Unusual login at payroll workstation (4:31:03)
Unusual login at payroll workstation (4:31:39)
Unusual login at payroll workstation (4:32:40)
Unusual login at payroll workstation (10:00:42)
Restricted query at HR database server (10:11:57)
Repeated querying of company directory (10:15:44)

*650*

Investigate *636*

*FIG. 6C*

SECURITY ALERT META-ANALYSIS FOR IDENTIFYING CAUSALLY RELATED EVIDENCE OF CYBERATTACKS

BACKGROUND

Many enterprises employ security detection tools that generate security alerts or findings on their computer networks. These security detection tools fall into categories such as Intrusion Detection System (IDS), Security Information and Event Management (SIEM), User and Entity Behavior Analytics (EUBA), Cloud Access Security Broker (CASB), Next Generation Firewall (NGFW), Web Application Firewall (WAF), and other types of systems. These systems are generally designed to analyze huge volumes of log data collected from the computer networks to detect actions, events, or conditions that indicate Tactics, Techniques and Procedures (TTPs) of potential cyberattacks.

While extremely valuable, such systems have some significant shortcomings when deployed on large enterprise networks. Given the limited visibility of a particular security detection system (typically limited to a single type of log) and the high volume of data, the alerts produced by the systems can include a large number of false positives that were triggered by benign user activities. Taken in isolation, the raw alerts contain only a limited amount of information and cannot be used as strong and robust indicators of an attack. Security analysts are faced with the difficult task of triaging and investigating the generated alerts and findings, which requires manual inspection and interpretation of data. In many cases, the sheer volume of alerts leads to alert fatigue and causes many alerts to go uninvestigated. According to one study, analysts at a typical company are only able to investigate 4% of the alerts that are generated each day.

BRIEF DESCRIPTION OF THE DRAWINGS

FIGS. 6A to 6C illustrate a user interface that reports clusters or causally related evidence pertaining to cyberattacks identified by the SAMA system, according to some embodiments.

Figure 1:
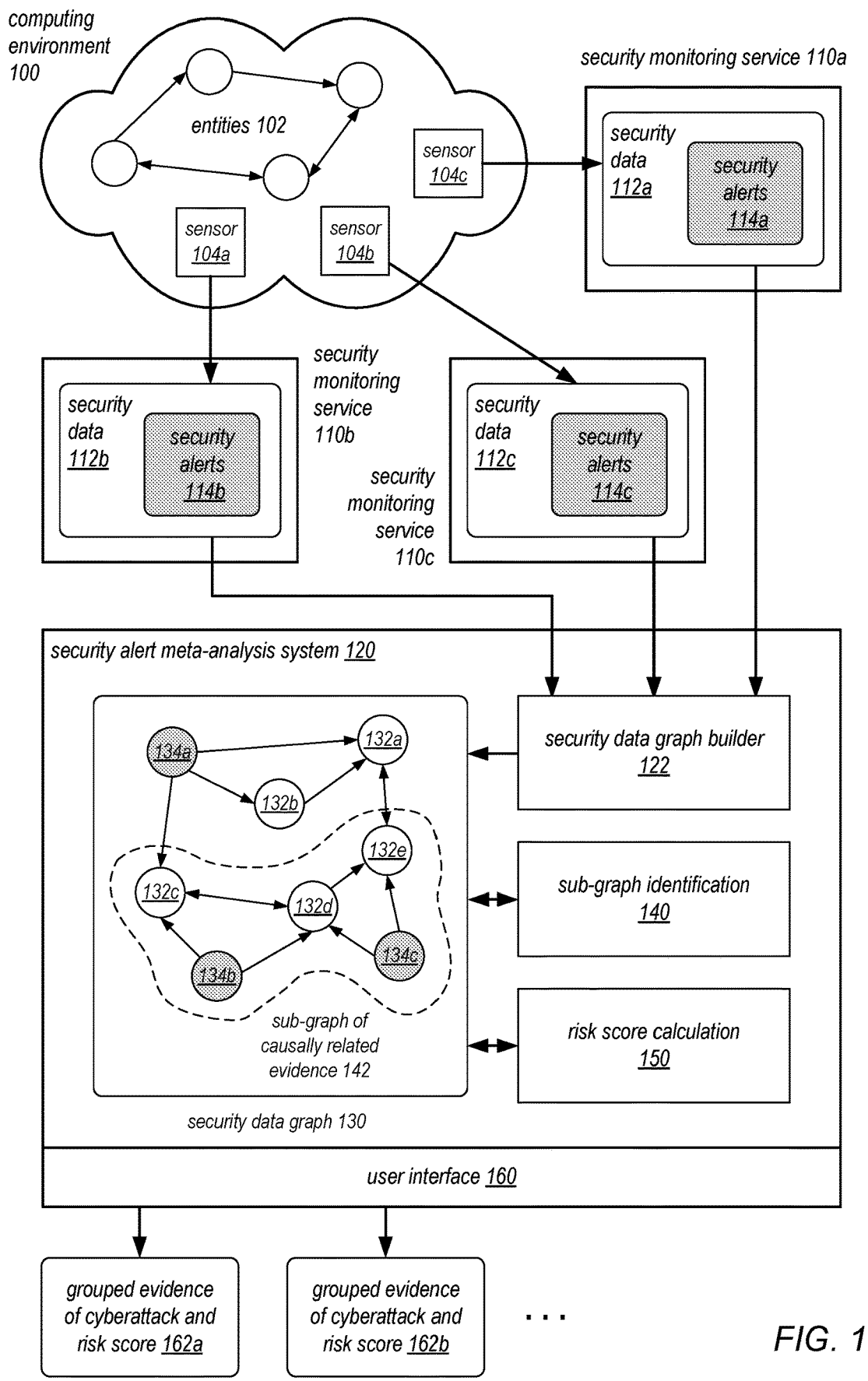
FIG. 1 illustrates a security alert meta-analysis (SAMA) system that builds and analyzes a security data graph to identify clusters or causally related evidence pertaining to cyberattacks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Alert fatigue is a significant problem in cybersecurity. Although many sophisticated security detection tools exist for monitoring large computer networks, they typically do not do a good job of filtering out false positives from the alerts they generate. The large amounts of alerts generated by these systems routinely overwhelm security analyst teams, causing many alerts to go uninvestigated. Moreover, it can be extremely difficult for security analysts to recognize when multiple alerts are "related," for example, when multiple alerts are caused by a single attack advancing through the network. These problems are aggravated when analysts must review different types of alerts generated by different types of security detection systems.

To address these and other problems in the state of the art, this application describes a security alert meta-analysis (SAMA) system that implements an additional stage of meta-analysis of the security alerts. During the meta-analysis, the cyberattack is modeled as a set of causally related actions, events, or conditions, some of which are recorded in the observation logs of the monitored network and linked to security alerts or findings detected by the upstream analytical tools. The goal of the meta-analysis is to detect in the security data alerts and findings that represent causally related evidence of an individual attack. In some embodiments, the meta-analysis uses an algorithm to uncover relationships among these discrete and high-volume alerts or findings, and combines them into a group of alerts or findings that represents the whole (or most) of the attack activity. The combined evidence from the group of related alerts or findings provides a strong boost to detection confidence and helps to suppress the false positives in the raw alerts.

In some embodiments, security data from upstream security monitoring services (e.g. the log data and the security alerts) are aggregated into a security data graph. The security data graph may be a time-varying property graph whose vertices represent entities observed in the monitored network (e.g. users, roles, compute instances, Internet Protocol (IP) address, etc.) and the security alerts. The vertices are connected by edges representing actions or relationships among the entities. In particular, individual security alerts are connected to the entities that are involved in the security alert.

Embodiments of the SAMA system combine aspects of Bayesian statistics, graph clustering, and machine learning to perform the meta-analysis. In some embodiments, the system builds a statistical model from a historical portion of the security graph data and applies the model to predict certain graph statistics of a current security data graph. The predicted statistics and current statistics of the security data graph are used to compute weights of the edges for newly observed events and alerts in a new security data graph. The weights are used to filter out statistically weak connections in the security data graph, resulting in a small set of connected sub-graphs (e.g. evidence clusters). By connecting and grouping security alerts in this fashion, the system is able to uncover attacks that otherwise would either go undetected, while at the same time discarding much of the isolated and random alerts that are most likely false positives. In some embodiments, the statistical model used to compute the edge weights uses one or more machine learning techniques to adapt to changing behavioral characteristics of the monitored network over time. In some embodiments, the sub-graphs resulting from the filtering and their statistical evidence are combined in Bayesian fashion to compute a risk score of individual clusters.

Depending on the embodiment, the disclosed system may be used to generate evidence clusters in different contexts. In a first "distributed" context, the system is used to generate evidence clusters repeatedly based on new alerts, which may be presented in periodic (e.g. daily) reports. In this embodiment, the system may be implemented using a highly scalable, batch-oriented job execution framework that is capable of quickly processing very large graphs. In a second "on-demand" context, the system may be used to perform a graph search to compute a single evidence cluster starting from a small set of seed vertices in a security data graph. This embodiment may be most suitable for user-interactive workflows to support analyst investigation processes.

At a high level, the disclosed system enables a hierarchical, two-stage analysis of security alerts. In the first stage, the alerts or findings are generated by a variety of independent upstream security monitoring services based on analysis of raw log data, each having a deep but narrow focus. In the second stage, the alerts or findings themselves are treated as data and are analyzed by the meta-analyzer. The final output of the analysis are the groups of related alerts or findings that represent causally related events that evidence individual attacks. In some embodiments, the analysis at both stages may be self-adjusting based on learnings about observed patterns and distributions of normal activity in the monitored network.

Advantageously, the disclosed system improves the efficiency and effectiveness of current cyberattack monitoring systems by boosting detection confidence, reducing false positive alerts, and grouping related alerts to provide a more complete view of a potential attack. The system generates reports that groups all relevant information about what happened in a series of related security alerts and which resources were involved. This information allows security analysts to quickly assess the situation, investigate deeper into the raw log data, and make appropriate triaging decisions.

Moreover, as discussed further below, embodiments of the system are implemented with computer components and features that improve the functioning of the system as a practical application. In some embodiments, the meta-analysis process may be implemented as data analytic jobs that are scheduled by a job scheduler. This scheduling may be performed to evenly spread out resource usage in the system over time, so that the system is able to scale to very large numbers of security data graphs. In some embodiments, the system may implement a job execution framework using serverless execution services and auto-scaled clusters, which are able to efficiently control resource usage to cope with fluctuating demand. In some embodiments, the system may partition security data graphs across a number of independently-operating resource cells. The partitioning may be used to provide a layer of security isolation for certain monitored networks and to allow the system to be easily scaled to large numbers of graphs of very large graphs. In some embodiments, the system may implement a configuration interface to define data analytic jobs as separately deployable packages. In this way, new types of jobs can be easily added to the system without reprogramming of the job execution framework. In some embodiments, the system may implement a job monitoring component that collects information about jobs running in the system, such as job status and job performance metrics. Such information may be used to implement a variety of job management functions such as job progress reporting, pausing and restarting of jobs, and automatic retrying of failed jobs.

As will be appreciated by those skilled in the art, features of the SAMA system disclosed herein may be implemented in current computer systems to solve existing technical problems in the state of the art and to improve the functioning of the current systems. These and other features and advantages of the disclosed system are discussed in further detail below, in connection with the figures.

FIG. 1 illustrates a security alert meta-analysis (SAMA) system that builds and analyzes a security data graph to identify clusters or causally related evidence pertaining to cyberattacks, according to some embodiments.

As shown, the figure depicts a security alert meta-analysis (SAMA) system 120, which is configured to receive security data 112a-c from different types of upstream security monitoring services 110a-c. The security data 112 is collected from a computing environment 100. The computing environment 100 may be a company private network that includes a large number of entities 102 that interact with one another. The computing environment 100 may be a network of physical computing resources located at a company premises, or a virtual network of virtual computing resources (e.g. virtual machine instances) provisioned in a multi-tenant cloud-based service provider network.

The entities 102 in the computing environment 100 may include different types of resources, accounts, or observations in the environment. For example, entities 102 may include hosts, mobile devices, networking devices, virtual machine instances, container instances, database instances, application clusters, data objects, security keys, network control rules, resource configurations, user accounts, client accounts (which may include many user accounts associated with a particular client), Identity and Access Management (IAM) roles, role sessions, network addresses such as Internet Protocol (IP) addresses, Domain Name System (DNS)

domains, geographic locations, and other types of entities. In some embodiments, the security data 112 may be stored as log data that stores time stamped events in the environment or activities among the entities 102. The security data 112 may be collected by sensors 104*a-c* that are configured to work with the security monitoring services 112*a-c*, for example, to periodically upload collected log data to the security monitoring services via a service interface. Depending on the monitoring service, the sensors 104 may be implemented as on-host data collection agents or off-host agents configured to observe network traffic among the entities.

In some embodiments, the security monitoring services 110*a-c* may perform a first-tier analysis of the collected log data to generate security alerts 114*a-c*. Depending on the monitoring service, the generated security alerts 114 may indicate events or conditions such as unusual or anomalous user or network activity (e.g. scanning of the network), unusual resource performance metrics, inappropriate connection or access patterns, presence of malware or malicious processes executing on the hosts, configuration check failures, security vulnerabilities or policy violations, and others. However, due to the narrow focus of each individual security monitoring service 112, the generated alerts 114 can include large proportions of false positives that are actually cause by benign activities in the network. Worse, the alerts 114 generated by these different systems must be manually reviewed to link related alerts that are signaling a particular attack. As discussed, due to the large volume of alerts generated by these systems 110 and the difficulty of recognizing "related" alerts across different security monitoring systems, analysts frequently fail to identify cyberattacks that are indicated by the data.

Embodiments of the SAMA system 120 are designed to solve these problems in conventional security monitoring systems. As shown, SAMA system 120 consumes the security data 112 (including any generated alerts 114). The security data 112 is aggregated by a security data graph builder 122 to build a security data graph 130. In some embodiments, the consumption of the security data 112 may be implemented using data loading jobs (e.g. jobs executed by an Extract, Transform, and Load (ETL) tool). The loading jobs may be programmed to parse the log files generated by the upstream services 110 or read the data repositories used by the upstream services, and load the security data into a graph database in a normalized format.

As shown, the security data graph 130 includes vertices 132*a-e* and 134*a-c* connected by directed edges. In this example, the uncolored vertices 132*a-e* indicate entities observed in the computing environment 100 or security data 112, and the colored vertices 134*a-c* indicate security alerts generated by the upstream security monitoring services 110. The edges in the graph may indicate relationships or activities among the entities (e.g., an ownership relationship or an observed interaction). In addition, the alerts 134 are connected to those entities 132 that were involved in or identified by the alert. In some embodiments, the graph building process is repeated for time slices of the security data to generate graphs for successive time periods (e.g. one graph per day). In some embodiments, the scope of graph 130 (e.g. which entities or alerts are included or excluded, the length of graph time interval, etc.) can be configured via a configuration interface of the SAMA system 120.

In some embodiments, the identification of causally related evidence of a cyberattack is performed by a sub-graph identification component 140, which is tasked with identifying connected sub-graphs (e.g. sub-graph 142) in the security data graph 130. Sub-graph 142 indicates a cluster of causally related evidence that is commonly attributable to a particular attack. To identify the sub-graphs 142, the sub-graph identification component 140 may remove or filter out vertices or edges in the security data graph 130 that are not probative of an attack activity. In some embodiments, the filtering rules or algorithm may be configurable or user selectable. As one example, the sub-graph identification process may remove edges in the graph 130 based on computed edge weights. The edge weights may be computed based on historical graph statistics of previous security data graphs generated from the computer environment 100. In some embodiments, the graph statistics may be maintained as a statistical model or function, which may be used to predict graph statistics such as the number of vertices, the number of edges, the average degree of the vertices, etc. In some embodiments, the statistical model may implement a function that takes into account factors such as the time of the graph, etc. In some embodiments, the sub-graph identification may employ one or more machine learned models, which may be updated or trained during the system's operation to continually adapt to gradual changes in the behavior of the network. In some embodiments, the sub-graph identification component 140 may write its results back into the security data graph 130 (e.g. back into the graph database storing the graph), so that downstream analytic components can use the sub-graphs identified by the sub-graph identification component 140 in their further analysis.

In some embodiments, the system 120 may implement a risk score calculation component 150, which is tasked with calculating a risk score for individual ones of the evidence clusters 142 identified in the graph 130. The risk score may be normalized (e.g. mapped to a range from 0 to 100) according to some other normalization scope (e.g across a single security data graph 130). In some embodiments, the risk score may be computed using the edge weights or other artifacts left by the sub-graph identification component 140, and/or historical graph statistics obtained from the statistical model. In some embodiments, the risk score may reflect a likelihood of the attack evidenced by the evidence cluster. In some embodiments, the risk score may indicate a severity of the evidence attack. In some embodiments, the risk score may depend on other factors such as an overall risk measure of the entire security data graph 130 (e.g. the amount of high-risk clusters in the graph), or risk scores of previous evidence clusters seen in recent security data graphs 130. As shown, the risk score calculation component 150 may write the risk scores back to the security data graph 130.

As shown, the SAMA system 120 may implement a user interface 160 to report its analysis results. In some embodiments, the user interface 160 may be implemented separately from the SAMA system 120. In some embodiments, the user interface may be a graphical user interface (GUI), for example a web-based console, used by security analysts to monitor the network for cyberattacks and investigate evidence of cyberattacks. In some embodiments, the user interface 160 may be an alert or notification interface such as an email, texting, or messaging interface. In some embodiments, the SAMA system 120 may implement a programmatic interface such as an Application Programming Interface (API) to transmit the analytic results to other software components. As shown, the analytic results indicate clusters 162*a-b* of grouped evidence that are causally related to a potential cyberattack. The analytic results may also indicate the risk scores calculated for the evidence clusters. In some embodiments, the user interface 160 may allow users to filter or sort reported evidence clusters based on the risk score. By performing the meta-analysis on upstream security alerts as described herein, the SAMA system 120 is able to (1) drastically reduce the amount of the false positives and (2) group related security alerts of attacks as evidence clusters, so that the alerts can be reviewed together.

Figure 2:
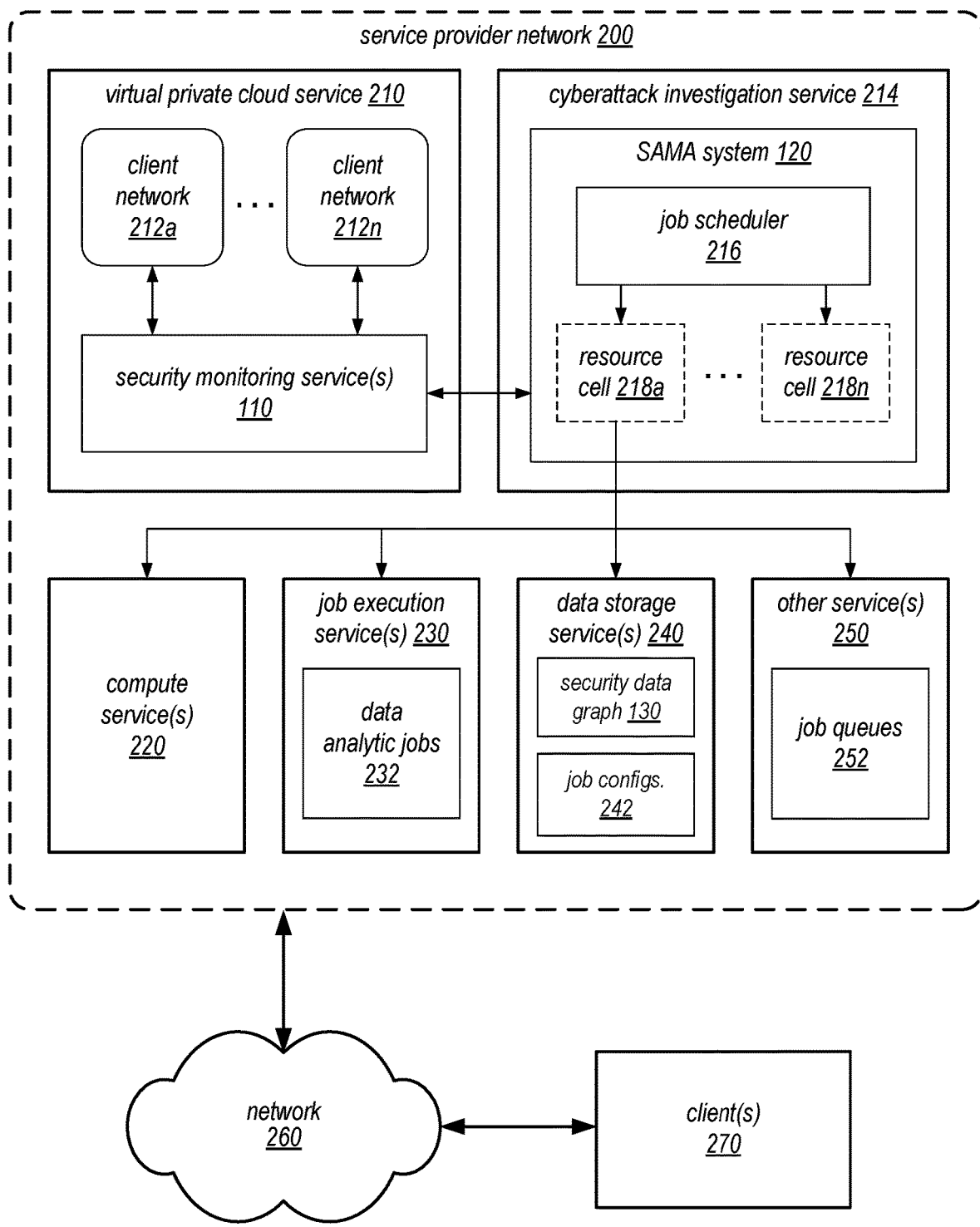
FIG. 2 illustrates a cloud-based service provider network that implements a cyberattack investigation service employing the SAMA system, according to some embodiments.

FIG. 2 illustrates a cloud-based service provider network that implements a cyberattack investigation service employing the SAMA system, according to some embodiments.

Service provider network 200 may be a private or closed system or may be set up by an entity such as a company or a public sector organization to provide one or more services (such as various types of cloud-based storage) accessible via the Internet and/or other networks to clients 270 in client premises networks, in some embodiments. Service provider network 200 may be implemented in a single location or may include numerous data centers hosting various resource pools, such as collections of physical and/or virtualized computer servers, storage devices, networking equipment and the like, needed to implement and distribute the infrastructure and services offered by the provider network 200. In some embodiments, provider network 200 may implement various computing systems, resources, or services, such as a virtual private cloud (VPC) service 210, one or more compute service(s) 220, job execution service(s) 230, database or data storage service(s) 240, as well as other types of services 250.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 10 and described below. In various embodiments, the functionality of a given system or service component (e.g., a component of data storage service 240) may be implemented by a particular node or may be distributed across several nodes. In some embodiments, a given node may implement the functionality of more than one service system component (e.g., more than one data store component).

The compute service(s) 220 may be implemented by service provider network 200 to offer instances, containers, and/or functions according to various configurations for client operations. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A container may provide a virtual operating system or other operating environment for executing or implementing applications. A function may be implemented as one or more operations that are performed upon request or in response to an event, which may be automatically scaled to provide the appropriate number computing resources to perform the operations in accordance with the number requests or events. A number of different types of computing devices may be used singly or in combination to implement the compute instances, containers, and/or functions of service provider network 200 in different embodiments, including general purpose or special purpose computer servers, storage devices, network devices and the like.

Compute instances, containers, and/or functions may operate or implement a variety of different services, such as application server instances, general purpose or special-purpose operating systems, services that support various interpreted or compiled programming languages such as Ruby, Perl, Python, C, C++ and the like, or high-performance computing services) suitable for performing client applications, without for example requiring the client(s) 270 to access an instance. Applications (or other software operated/implemented by a compute instance and may be specified by client(s), such as custom and/or off-the-shelf software.

In some embodiments, compute instances, containers, and/or functions have different types or configurations based on expected uptime ratios. The uptime ratio of a particular compute instance may be defined as the ratio of the amount of time the instance is activated, to the total amount of time for which the instance is reserved. Uptime ratios may also be referred to as utilizations in some implementations. If a client expects to use a compute instance for a relatively small fraction of the time for which the instance is reserved (e.g., 30% to 35% of a year-long reservation), the client may decide to reserve the instance as a Low Uptime Ratio instance, and pay a discounted hourly usage fee in accordance with the associated pricing policy. If the client expects to have a steady-state workload that requires an instance to be up most of the time, the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Compute instance configurations may also include compute instances, containers, and/or functions with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). Size of compute instances, containers, and/or functions, such as a particular number of virtual CPU cores, memory, cache, storage, as well as any other performance characteristic. Configurations of compute instances, containers, and/or functions may also include their location, in a particular data center, availability zone, geographic location, etc. and (in the case of reserved compute instances, containers, and/or functions) reservation term length.

To implement the VPC service 210, the service provider network 200 may implement a physical or substrate network (e.g., sheet metal boxes, cables, rack hardware) referred to as the substrate. The substrate can be considered as a network fabric containing the physical hardware that runs the services of the provider network, and can include networking devices such as routers, switches, network address translators (NATs), and so on, as well as the physical connections among the devices. The substrate may be logically isolated from the rest of the service provider network, for example it may not be possible to route from a substrate network address to an address in a production network that runs services of the service provider, or to a customer network that hosts customer resources.

The VPC service 210 may implement one or more client networks 212a-n as overlay networks of virtualized computing resources (e.g., compute instances provided by the compute service(s) 220, block store volumes, data objects such as snapshots and machine images, file storage, databases provided by the database or data storage service(s) 240) that run on the substrate. In at least some embodiments, hypervisors or other devices or processes on the network substrate may use encapsulation protocol technology to encapsulate and route network packets (e.g., client IP packets) over the network substrate between client resource instances on different hosts within the provider network. The encapsulation protocol technology may be used on the network substrate to route encapsulated packets (also referred to as network substrate packets) between endpoints on the network substrate via overlay network paths or routes. The encapsulation protocol technology may be viewed as providing a virtual network topology overlaid on the network substrate. As such, network packets can be routed along the substrate network according to constructs in the overlay network (e.g., VPCs, security groups). A mapping service can coordinate the encapsulation and routing of these network packets. The mapping service can be a regional distributed look up service that maps the combination of overlay IP and network identifier to substrate IP so that the distributed substrate computing devices can look up where to send packets.

To illustrate, each physical host can have an IP address in the substrate network. Hardware virtualization technology can enable multiple operating systems to run concurrently on a host computer, for example as virtual machines on the host. A hypervisor, or virtual machine monitor, on a host allocates the host's hardware resources amongst various virtual machines on the host and monitors the execution of the virtual machines. Each virtual machine may be provided with one or more IP addresses in the overlay network, and the virtual machine monitor on a host may be aware of the IP addresses of the virtual machines on the host. The virtual machine monitors (and/or other devices or processes on the network substrate) may use encapsulation protocol technology to encapsulate and route network packets (e.g., client IP packets) over the network substrate between virtualized resources on different hosts within the cloud provider network. The encapsulation protocol technology may be used on the network substrate to route encapsulated packets between endpoints on the network substrate via overlay network paths or routes. The encapsulation protocol technology may be viewed as providing a virtual network topology overlaid on the network substrate. The encapsulation protocol technology may include the mapping service that maintains a mapping directory that maps IP overlay addresses (public IP addresses) to substrate IP addresses (private IP addresses), which can be accessed by various processes on the service provider network for routing packets between endpoints.

In some embodiments, at least a subset of virtualization management tasks may be performed at one or more offload cards coupled to a host so as to enable more of the processing capacity of the host to be dedicated to client-requested compute instances—e.g., cards connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like. The offload card can function as a network interface card (NIC) of a host in some implementations, and can implement encapsulation protocols to route packets.

As shown, in some embodiments, the security monitoring services 110 of FIG. 1 may be implemented as part of the VPC service 210. In other embodiments, the security monitoring services may be implemented as standalone services in the service provider network 200 separate from the VPC service 210. In some embodiments, a security monitoring service 110 may capture and log relevant events or observations in a client network 212 according to client configuration. The collected security data may include events generated by each of the various services 220, 230, 240, and 250 provided by the service provider network. In some embodiments, a security monitoring service 110 may inspect and analyze the collected log data for security vulnerabilities or signals of a cyberattack, and generate security alerts 114. For example, security alerts may be generated for anomalous network traffic or on-host activities, detection of malware, detection of known attack signatures or patterns, communications with malicious IP addresses or domains, inappropriate configuration settings or changes, etc.

As shown, the SAMA system 120 in this example is implemented as part of a cyberattack investigation service 214. In some embodiments, the cyberattack investigation service 214 may be a service operated in part by human security analysts to continuously monitor the client networks 212 for signs of cyberattacks and investigate alerts generated by the security monitoring services 110 and SAMA system 120. In some embodiments, the cyberattack investigation service 214 may implement the user interface 160 of FIG. 1, and may be used by security analysts to initiate remedial actions in response to detected attacks. In some embodiments, the cyberattack investigation service 214 may be implemented at least partly external to the service provider network 200.

As shown, in some embodiments, the SAMA system 120 may implement a job scheduler 216, so that the meta-analysis process is executed as data analytic jobs 232. For example, a data analytic job 232 may be run for each client network 212, and for each successive time period (e.g. once a day). The SAMA system may employ multiple types of jobs for different steps of the meta-analysis process, each of which can be executed asynchronously on its own separate schedule. In some embodiments, the job scheduler 216 may dynamically schedule the jobs in a manner to avoid resource usage collision or contention within the system. The scheduling policy used by the scheduler may be configurable via the SAMA system configuration interface.

As shown, in some embodiments, the SAMA system 120 may employ a number of independently-operating resources cells 218a-n to execute the data analytic jobs 232. Each resource cell 218 is able to perform a data analytic job 232 independently from other resource cells. In some embodiments, the resource cells may be located across different data centers or geographic locations. In some embodiments, each client network 212 may assigned a respective resource cell 218 so that all jobs 232 on the security data graph of the client network are performed by the assigned cell. Depending on the embodiment, the assignment may be made to isolate certain client networks for security reasons, or to more evenly distribute job workloads across the different cells. In some embodiments, a particular client network 212 may be reassigned either manually by an administrator or automatically by the system in response to certain conditions. For example, in some embodiments, client networks may be reassigned to a new cell when an existing cell experiences a resource failure.

In various embodiments, the job execution service(s) 230 may include different types of execution services employing different execution models. In some embodiments, the job execution service(s) 230 may include a serverless execution system that executes serverless functions in response to event triggers. The serverless execution service may provision compute nodes to execute the function on an as-needed basis, instead of maintaining committed computing resources for execution. When a serverless function is not being executed, the serverless execution service may move idle compute nodes to a general pool of available nodes that can be used to execute other serverless functions.

In some embodiments, the job execution service(s) 230 may implement a distributed execution environment that includes a cluster of worker nodes that are programmed using a common programming model. Such a distributed execution environment allows a data analytic job 232 to be divided into sub-jobs that can be executed by individual ones of the worker nodes in parallel. In some embodiments, the security data graph 130 may be stored in a distributed fashion (e.g. in a distributed graph database), and the worker nodes may be configured to process different portions of the graph in parallel. In some embodiments, the distributed execution environment may be automatically scaled so that worker nodes are added and/or removed based on the demand level and in response to node failures.

In various embodiments, database services 240 may be various types of data storage and processing services that perform general or specialized data storage and processing functions (e.g., analytics, big data querying, time-series data, graph data, document data, relational data, non-relational data, structured data, semi-structured data, unstructured data, or any other type of data processing operation) over data that is stored across multiple storage locations, in some embodiments. For example, the data storage or database service(s) 240 may include various types of data storage services (e.g., relational, NoSQL, document, or graph databases) for storing, querying, and updating data. Such services may be enterprise-class database systems that are scalable and extensible. Queries may be directed to a database in database service(s) 240 that is distributed across multiple physical resources, and the database system may be scaled up or down on an as needed basis, in some embodiments. The database system may work effectively with database schemas of various types and/or organizations, in different embodiments. In some embodiments, clients/subscribers may submit queries or other requests (e.g., requests to add data) in a number of ways, e.g., interactively via an SQL interface to the database system or via Application Programming Interfaces (APIs). In other embodiments, external applications and programs may submit queries using Open Database Connectivity (ODBC) and/or Java Database Connectivity (JDBC) driver interfaces to the database system.

As shown, in some embodiments, the security data graph 130 generated by the SAMA system 120 may be stored in the data storage service 240, for example, an instance of a graph database. In some embodiments, the data storage service(s) 240 may also be used to store job configuration data 242 that controls the execution of the data analytic jobs 232. Depending on the embodiment, the job configuration data 242 may be stored as one or more files in a file system, as table data in a relational database, etc. The job configuration information 242 may specify job execution parameters such as the execution schedule, various constraints on job execution, connections to any resources needed for the execution, the number of worker nodes to use for execution, among other things. In some embodiments, the configuration information may include a script or executable that implements the job itself. The system may allow new types of jobs to be added to the system by simply adding a new job configuration, without having to reprogram the job execution framework. In some embodiments, the job configuration information 242 may be configurable via the configuration interface of the SAMA system 120.

In various embodiments, the other service(s) 250 may include other types of services provided by the service provider network 200 that are used to support the SAMA system 120. As just one example here, one type of service 250 that may be used by the SAMA system is a queuing service. Such a queuing service may be used to implement one or more job queues 252—in the SAMA system 120. The queuing service may be implemented using a set of managed compute nodes provided by the compute service 220, and offer a variety of features such as queue ordering policies and/or access semantics. In some embodiments, the job queue 252 used by the SAMA system 120 is a first-in-first-out (FIFO) queue.

Generally speaking, clients 270 may encompass any type of client configurable to submit network-based requests to service provider network 200 via network 260. For example, a given client 270 may include a suitable version of a web browser, or may include a plug-in module or other type of code module that may execute as an extension to or within an execution environment provided by a web browser. Alternatively, a client 270 may encompass an application such as a database application (or user interface thereof), a media application, an office application or any other application that may make use of resources in in service provider network 200 to implement various features, systems, or applications. (e.g., to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 270 may be an application that interacts directly with service provider network 200. In some embodiments, a client 270 may implement user interface 160 of the SAMA system shown in FIG. 1.

The clients 270 may convey network-based services requests (e.g., materialized view creation requests) to and receive responses from service provider network 200 via network 260. In various embodiments, network 260 may encompass any suitable combination of networking hardware and protocols necessary to establish network-based-based communications between clients 270 and service provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, a given client 270 and service provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 270 and the Internet as well as between the Internet and service provider network 200. It is noted that in some embodiments, clients 270 may communicate with service provider network 200 using a private network rather than the public Internet.

Figure 3A:
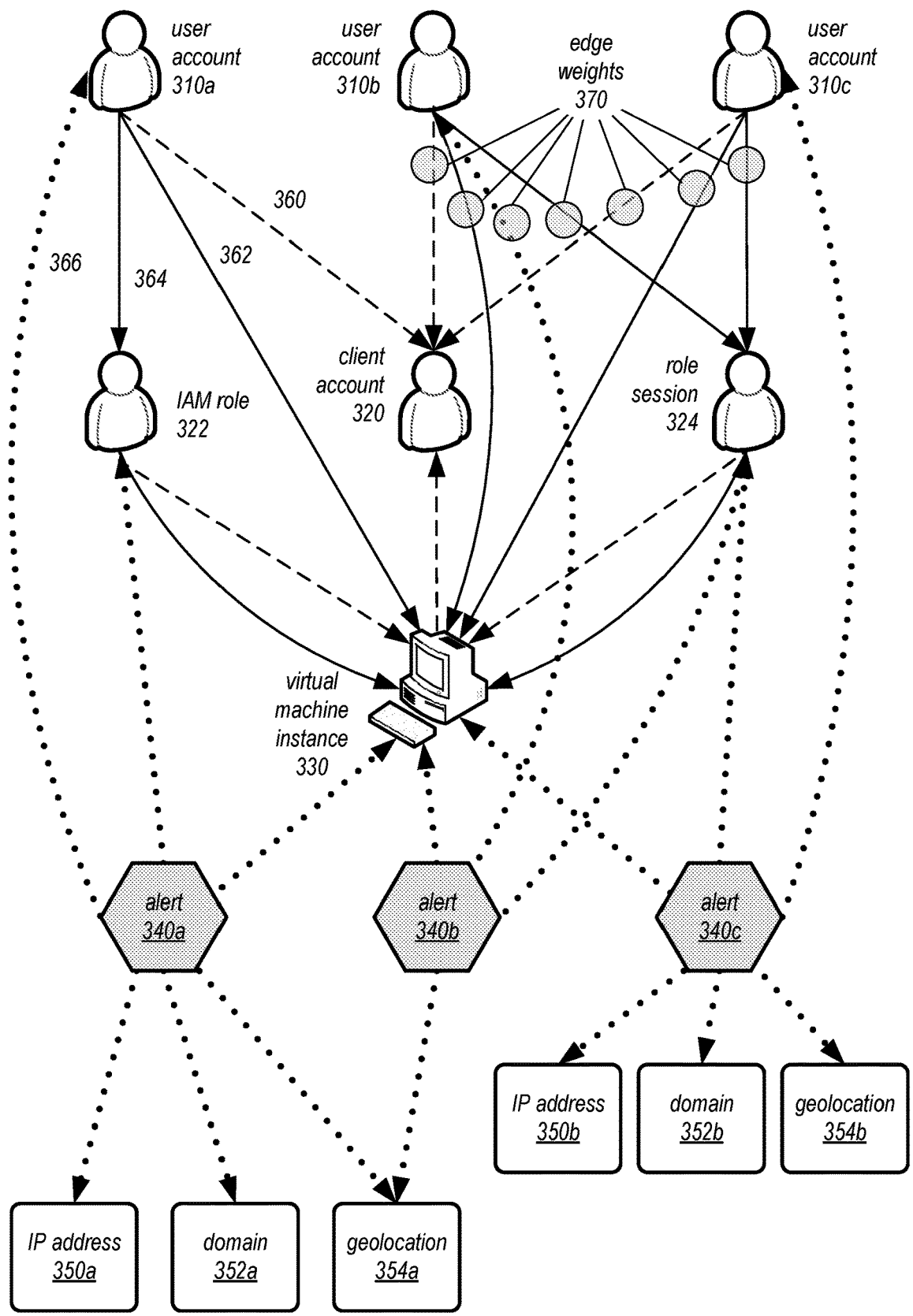
FIGS. 3A and 3B illustrate a security data graph that is filtered based on edge weights to determine clusters of causally related evidence pertaining to cyberattacks, according to some embodiments.
Figure 3B:
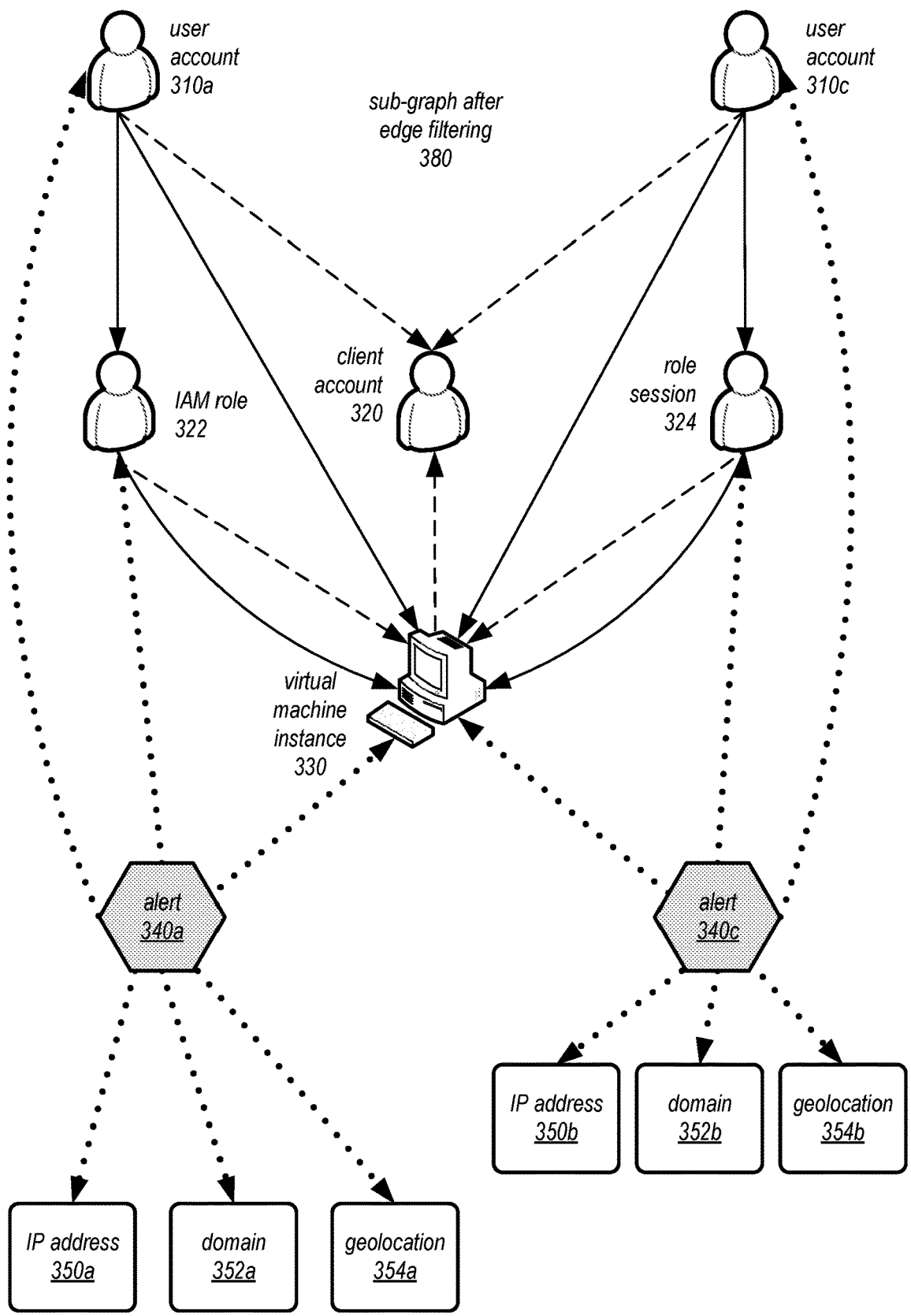

FIGS. 3A and 3B illustrate a security data graph that is filtered based on edge weights to determine clusters of causally related evidence pertaining to cyberattacks, according to some embodiments.

FIG. 3A illustrates an example of security data graph 130 of FIG. 1. The graph may be constructed from multiple types of log data and security alerts obtained from upstream security monitoring services, selecting events for facts from the data to facilitate creating causal chains of events that may fit a potential attack pattern. The vertices in the graph represent natural pivots or join points on the graph. They can represent resources that belong to the monitored computing environment, such as a computing resource (e.g. a virtual machine instance 330), client account(s) 320, user account(s) 310*a-c*, role(s) 322, role session(s) 324, etc. The vertices can also represent resources such as Internet Protocol (IP) addresses 350*a-b*, Domain Name System (DNS) domains 352*a-b*, geo-locations 354*a-b*, etc. Some of the vertices may represent external resources that lie outside (but were observed by) the computing environment.

The edges in the graph may represent relationships or interactions among the vertices based on events, actions, or associations inferred from the security data. As in the case of the vertices, they are selected based on their ability to represent a causal chain of events in a potential attack, and serve to connect the findings triggered by related malicious activity.

FIG. 3A shows a number of different types of vertices. Based on a resource's properties, it is also possible to define subtypes that provide additional refinement. For example, in some embodiments, there may be several types of "user" vertices: IAM-user, root, etc. IP address and DNS domain vertices can be of different types depending on whether they appear on any threat intelligence list and, if they do, which threat intelligence feed provided it. The full type of the vertex may be determined by its class and its type. In some embodiments, the full type is used in computation of the connectivity or edge weights 370 used to identify clusters of related evidence for attacks.

As shown, the vertices may be connected with different types of links or edges. The types of the edges depend on the types of vertices that they connect. For example, in the figure, edge 360 is a "belongs to" type edge, edge 362 is a "interacted with" type edge, and edge 364 is an "assumed" type edge. In some embodiments, the edge types of the edges are also used to compute the edge weights 370.

As shown, the graph also includes vertices 340*a-c* that represent findings or security alert 114 in the security data. The alert vertex 340 represents a single instance of an alert generated by one of the upstream security monitoring services. The vertex may represent a specific TTP associated with an attack. In some embodiments, the alert vertex may be subtyped according to the alert category assigned to the alert by the upstream security monitoring service. The activity represented by an alert often involves multiple resources. These resources are connected to the alert via an "involves" type link 366.

In some embodiments, the role session 324 vertex represents an instance of role assumption in the computing environment. When a user assumes a role, he or she may provide a session name on the command line or as an input parameter to the corresponding API call. The combination of the role name and the session name creates an "assume role" principal, which is essentially a personalized instantiation of the role. Since multiple users can assume the same role, this personalization provides a more granular view of the activity performed under the role. The role session vertex 324 is used to trace role assumption activities at a more granular level. This type of vertex is important in some cloud computing environments because most of the actions in the environments are performed via role assumption, and role assumption chains can become complicated and ambiguous. To trace role assumption activity, a special type of "assume role" edge may be used. In some computing environments, this is the most common edge type in the security data graph.

In some embodiments, graph edges are typed or classified based on whether they are a static relationship or a dynamic interaction. For example, the "belongs to" edge 360 in the graph represents a static relationship between the user account 310*a* and the client account 320, which is typically defined in a static policy. Similarly, the "associated to" relationship between the IAM role 322 and the virtual machine instance 330 can be considered a static relationship, since the role is specifically attached to the instance. On the other hand, the "interacted with" edge 362 and "assumed" edge 364 represent actions that are performed at a moment in time, and are thus classified as dynamic interaction edges. In some embodiments, computation of the edge weights 370 in the graph are dependent on the edges' respective types or classifications.

In some embodiments, the sub-graph identification algorithm uses local approximation to distinguish between salient and non-salient edges in the graph. The graph is represented as a collection of triplets (source vertex, edge, destination vertex), and the edge weight is calculated based on statistical properties of the triplet. If an edge weight is above a connectivity threshold, the connection or edge is activated or retained. Otherwise, the connection or edge is deactivated and the edge is not used. Once the graph is filtered in this manner based on the edge weights, the resulting component sub-graphs are interpreted as representing related activity that triggered security alerts and causally related evidence of an attack. For example, FIG. 3B illustrates a sub-graph 380 that remains after edge filtering.

As shown, alert 340*b* has been removed from the graph because its edge weights did not survive the filtering. Most likely, alert 340*b* is a false positive that was triggered by benign activities in the network. On the other hand, identification of the sub-graph 380 bolsters the case that alerts 340*a* and 340*c* are genuine signals a single attack due to the fact that they involved common entities, occurred in a relatively short time window, and included edge weights that indicated they were statistically significant events.

In some embodiments, to reduce the number of false associations, a conservative approach is taken to require that for any pair of edges sharing a vertex, the odds that the edges are related must be higher than the odds that the edges are unrelated (random). In some cases, this restriction can be overly conservative. An attack might result in a sub-graph that does not satisfy this condition, and the algorithm cannot uncover its full scope if some of the low-weight edges are filtered out. However, the restriction is justified in most cases given the large size of the security data graphs typically encountered. In practice, the threshold for connectivity weight can be adjusted or configured via a configuration interface of the system, based on operational requirements (tolerance to false associations). In some embodiments, non-local and non-linear machine learning algorithms for edge filtering can be implemented, for example, to dynamically adjust the weight threshold.

The intuition behind the edge weight formulation can be understood from the perspective of a single vertex. In general, a given vertex can have in and out edges of different types representing actions, events, or associations. Some edges might be part of the coordinated activity and are causally related to each other, and some (or maybe all) are random edges that are connected to the same vertex by chance.

The simplest case is a sub-graph consisting of three vertices $A_i$, $B_j$, and $C_k$, and two edges $e(A_i, B_j)$, $e(A_i, C_k)$. In the notation user herein, a capital letter denotes the class of the vertex determined by its type, if applicable, and the subscript denotes the specific instance of the vertex of that class and type. Depending on the orientation of the edges, the distinct possibilities are: in-in, in-out, out-in and out-out. In what follows, the edge orientation enters only in the form of in-degree or out-degree for the joining vertex $A_i$. For simplicity, this dependence is omitted in derivation and introduced in the final formula.

As discussed, the edges may represent actions, and the vertices may represent resources. In the event of an attack, the actions are causally related. The algorithm assumes that in the event of benign activity, the actions are uncorrelated. Connectivity strength can thus be defined by the likelihood ratio of the odds that the observed edges are due to attack activity or due to benign activity. The likelihood ratio in this case is given by:

$$\Lambda = \frac{p(A_i, B_j, C_k, e(A_i, B_j), e(A_i, C_k)|1)}{p(A_i, B_j, C_k, e(A_i, B_j), e(A_i, C_k)|0)} \quad (1)$$

$$= \frac{p(A_i)p(B_j)p(C_k)p(1)}{p(A_i|e(A,B))p(e(A,B))p(B_j)p(A_i|e(A,C))p(e(A,C))p(C_k)p(0)} \quad (2)$$

$$= \frac{p(A_i)}{p(A_i|e(A,B))p(e(A,B))p(A_i|e(A,C))p(e(A,C))} \frac{p(1)}{p(0)} \quad (3)$$

$$= \frac{\sqrt{p(A_i)}}{p(A_i|e(A,B))p(e(A,B))} \frac{\sqrt{p(A_i)}}{p(A_i|e(A,C))p(e(A,C))} \frac{p(1)}{p(0)} \quad (4)$$

$$= e^{w_{AB}(A_i)}e^{w_{AC}(A_i)} \frac{p(1)}{p(0)}, \quad (5)$$

where $w_{AB}(A_i)$ and $w_{AC}(A_i)$ are the one-sided edge or connectivity weights, for edges of type $e(A,B)$ and $e(A,B)$, respectively. The weights are one-sided because in general, a given edge may have two such one-sided edge weights, one for each vertex the edge connects. The ratio $p(1)/p(0)$ accounts for the prior odds of an attack versus benign activity. It is a constant factor that rescales the likelihood ratio for all types of edges by the same amount. Thus, the one-sided edge weight is given by the formula:

$$w_{AB}(A_i) = \frac{\sqrt{p(A_i)}}{p(A_i|e(A,B))p(e(A,B))}. \quad (6)$$

The denominator, which is the probability to observe the given edge on a given vertex in the absence of the attack, may be expressed via the corresponding rate and Poisson probability, as:

$$p(A_i|e(A,B))p(e(A,B))=1-e^{-R_{AB}(A_i)T}. \quad (7)$$

The time, $T$, can be computed by taking the difference between the timestamps of the edges, which means the weights are smaller for edges that are closer in time. In some embodiments, the computation may be simplified by setting $T$ to a constant period (e.g. a 24-hour day period). To implement this, embodiments of the SAMA system are configured to "slice" the security data graph along the time dimension, and consider each slice separately. This ensures that the system does not correlate events that are separated by more than one day. This simplification is not fundamental, and all of the below formulas can be generalized to account for different and/or varying correlation times. In some embodiments, the size of the time slice may be a configurable parameter of the system. For the sake of brevity, this time dimension is omitted from the formulas below. All quantities (e.g. rates, average degree, etc.) that have time units should be understood as being prorated based on the time period. The average quantities, unless explicitly stated otherwise, should be understood as average quantities over this period, where the average is taken over time.

The rate, $R_{AB}(A_i)$, depends on the edge type and the destination vertex. Some vertices might be more active than others. This dependency on destination vertex may be parametrized as:

$$R_{AB}(A_i)=v_{AB}(A_i)\hat{R}_{AB}, \quad (8)$$

where $\hat{R}_{AB}$ is the average rate of edges of AB type, and $v_{AB}(A_i)$ is the relative vertex weight. The vertex weight may be computed as:

$$v_{AB}(A_i) = \frac{\widetilde{\deg}_{AB}(A_i) + 1}{\hat{n}_{AB} + n_A}, \quad (9)$$

where $\widetilde{\deg}_{AB}(A_i)$ is the average degree for vertex $A_i$ of edge type AB, $\hat{n}_{AB}$ is the average total number of edges for the edges of this type across all vertices, and $n_A$ is the total number of vertices of type A.

The vertex weights may be normalized to satisfy the following normalization condition:

$$\sum_i v_{AB}(A_i) = 1. \quad (10)$$

The normalization condition ensures that the sum of the vertex-specific rates over all vertices is consistently equal to the average rate of the entire security data graph:

$$\sum_i R_{AB}(A_i) = \hat{R}_{AB}. \quad (11)$$

The average rate can be estimated as the average number of edges (e.g. per day):

$$\hat{R}_{AB}=\hat{n}_{AB}. \quad (12)$$

The probability for the attack to involve a given vertex can be estimated as:

$$p(A_i) = \frac{1}{n_A}. \quad (13)$$

Combining it all, the edge weight man be expressed as:

$$w_{AB}^{in/out}(A_i) = -\frac{1}{2}\ln n_A - \ln\frac{\widetilde{\deg}_{AB}^{in/out}(A_i)+1}{\hat{n}_{AB}+n_A} - \ln\hat{n}_{AB}. \quad (14)$$

As shown, the above formulation introduces the explicit dependence on the directionality of the edges, and specifies that the in/out weights are determined by the in/out degrees of the vertex. Note that when the number of edges is significantly less than the number of vertices $\hat{n}_{AB} \ll n_A$, the edge weight is proportional to $w_{AB}(A_i) \approx (1/2) \ln n_A$. In this case, the weight changes with the logarithm of the number of the corresponding vertices in the graph. If, on the other hand, the number of edges is much greater than the number of vertices, then the weight is proportional to $w_{AB}(A_i) \sim -\ln \widetilde{\deg}_{AB}(A_i)$. In this case, the weight is characterized primarily by the average rate at which the edges are observed on the specific vertex. The edge weight is decreasing with the increasing rate of edges.

The one-sided connectivity weight can be also written as:

$$w_{AB}^{in/out}(A_i) = -\ln\left(\widetilde{\deg}_{AB}^{in/out}(A_i)+1\right) - \frac{1}{2}\ln n_A + \ln\left(1+\frac{n_A}{\hat{n}_{AB}}\right) \quad (15)$$

$$\approx -\ln\left(\widetilde{\deg}_{AB}^{in/out}(A_i)+1\right) + \ln\left(\frac{\sqrt{n_A}}{\hat{n}_{AB}}\right). \quad (16)$$

The above formulation provides further insight into the behavior of the weights. In this approximation, if the contribution from the degree of the vertex is omitted, then for the weight to be positive, the number of edges should be smaller than the square root of the number of vertices. In other words, the edges should be sufficiently rare in order to ensure that the probability of chance co-location of the same vertex is small. This is directly related to the birthday problem, an approximation used to determine the probability that any two out of n persons do not have the same-day birthday.

The one-sided edge weight is formulated with respect to the vertex that joins a pair of in/out edges. As such, it can be interpreted as the vertex edge weight or function, which assigns the weight to any in or out edge based on its type. Up to the constant prior factor, p(1)/p(0), the log-likelihood ratio for a pair of edges joined by the vertex is given by the sum of two one-sided vertex edge weights:

$$\ln \Lambda = w_{AB}^{in/out}(A_i) + w_{AC}^{in/out}(A_i). \quad (17)$$

The ratio measures the odds that the two edges are related against the odds that they are co-located by random chance. The positive log-likelihood ratio implies that the odds of being related are greater than the odds of being random. As a result, for edges with positive weights, the log-likelihood ratio of each edge pair joined on a vertex is positive. In general, this condition is stronger than required. An edge with a large positive weight might compensate for the slightly negative weight of another edge.

The last step in the derivation is to apply the formula for one-sided edge weight to the case of the triplet. The edge being connected to a pair of vertices has two one-sided edge weights, one for each vertex. Since, in general, the edge might join with other edges via any of the vertices, one filtering criteria is to require it to have a positive edge weight on both ends. One way to ensure this is to select the smallest of the one-sided vertex connectivity weights as the full edge weight:

$$w(e(A_i, B_j)) = \min\{w_{AB}^{out}(A_i), w_{AB}^{in}(B_j)\}. \quad (18)$$

One configurable parameter of the edge filtering algorithm is the filtering threshold for the edge weights. In some embodiments, the threshold value of the weight may be set to zero. The setting specifies that for any pair of edges in the sub-graphs formed from the positive-weight edges, the odds that they are related should be greater than the odds of them being random. However, the threshold might be tuned lower or higher depending on the level of tolerance for false associations. In some embodiments, the SAMA system may provide an option to override certain types of full or one-sided weights. This option may be used for edges that are known to imply a strong a priori relation, which do not require statistical inference to confirm.

To practically and efficiently implement the edge filtering algorithm described above to discover connected clusters of security alerts, embodiments of the SAMA system are built based on a number of implementational choices.

First, for certain edge types, the SAMA system may allow users to include or exclude the edge regardless of the weight. For example, an edge type may always be retained by the filtering process by setting their edge weights to infinity. These types of decisions can have a significant influence on the final results, and in some cases, they are better left to the security analyst. Second, to make the weight computation fast, embodiments of the SAMA system use specially designed data structures to efficiently store and easily access statistical components needed by the computation. Third, the computation is implemented in a scalable fashion (e.g. as a distributed graph algorithm), so that the system can operate over a large number of security data graphs and graphs of very large sizes. Finally, the system implements a modified best-first search algorithm to allow users to identify an evidence cluster based on some starting vertex. The searching is performed at interactive speed to support user interactive workflows.

As discussed above in connection with Equation (14), the edge weight computation uses several statistical components to calculate edge weights: (a) the count of the number of instances of each vertex class over time, used to compute the number of vertices $n_A$, (b) the count of the number of edges of a given type over time, used to compute the average number of edges $\hat{n}_{AB}$, and the count of the number of edges over time for each vertex, grouped by edge type, used to compute the average degree $$\widetilde{\deg}_{AB}^{in/out}(A_i).$$

In some embodiments, these statistical quantities are stored as or provided by a statistical model that reflects historical statistics about graph data in previous security data graphs. The global counts of vertices $n_A$ and edges $\hat{n}_{AB}$ are fairly small data structures, and may be stored and kept up-to-date as query-able objects by distributed processes. In some embodiments, these data objects may be replicated during a distributed computation without incurring excessive network or communication costs.

In some embodiments, the historical data for each vertex such $$\widetilde{\deg}_{AB}^{in/out}(A_i)$$

are larger data structures that qualify as "big data." The memory used by these data structures depend on the number of entities in the database, and typically must be stored in a distributed fashion. It is difficult to perform graph-wide computations about edge weights for these big data structures. To overcome these challenges, embodiments of the SAMA system implement statistical model maintenance and edge weight computation processes using distributed computing techniques. For example, in some embodiments, these processes are performed in a distributed fashion by a cluster of worker nodes (e.g. an APACHE SPARK cluster), which can be used to process different parts of the graph in parallel.

In some embodiments, the SAMA system implements two variants of evidence cluster identification processes depending on the usage context. In a first, distributed graph variant, a distributed compute engine such as APACHE SPARK is used to implement a triplet engine for each edge. The edge weights are completely determined by the triplet of the edge and its two endpoints (and their respective features), and the triplet engine can be used to generate the security data graph's triplets (essentially a one-hop graph-oriented join) and assign a weight to each edge. The computation may include any desired manual overrides to the weights.

Once edge weights are assigned, the system applies a weight threshold to filter out any edges that do not meet the threshold. The resulting above-threshold sub-graphs represent the evidence clusters of attacks. To extract an evidence cluster from the graph database, the system can run a connected components algorithm on the sub-graph.

In the second, on-demand single cluster variant of the process, a single evidence cluster is computed from a starting point (one or more seed vertices). For this variant, the graph database (e.g. the SQRRL graph database) stores the graph data so that (1) a vertex's features are fast to query, and (2) the neighbors of the vertex are fast to query, but not necessarily the features of the neighbors. Relying on these properties of the graph database, embodiments of the SAMA system can implement an efficient breadth-first search (BFS) algorithm to crawl the graph and identify the evidence cluster based on computed edge weights, without having to explore unnecessary branches.

In some embodiments, a breadth-first search approach is used, where the edge weight is computed for each edge traversed. When the search arrives at a new vertex, the vertex's features are queried. The process then looks back one step and removes any edges that fall below the weight threshold. In some embodiments, edge computations for very high-degree vertices may be parallelized, so that the weights can be determined more quickly.

In embodiments where the edge weight is the minimum of two one-sided weights, each weight depending only on the features of one of the endpoints, the search process may be optimized by pre-pruning any edges that would fall under the threshold based on just one of the one-sided weights. This pre-pruning relieves the search process from having to visit the remote vertex via a pruned edge and analyze the remote vertex's features. As a result, the search essentially becomes a best-search first.

The pseudocode below more formally describes the on-demand search algorithm for constructing a connection component sub-graph starting from a seed vertex. In the pseudocode, s denotes the starting vertex, U denotes the set of unresolved vertices, R denotes the set of resolved vertices, H denotes the set of half-resolved vertices, and result is the identified connected subgraph.

---

Algorithm for On-Demand Construction of Connected Sub-Graph

```
add starting vertex s to U
while U is non-empty do
  for each vertex n in U do
    remove n from U
    add n to R
    if n is an alert then
      add n to result.alerts
    else
      add n to result.entities
    call graph query service to get set of half-resolved edges E connected to n
      where one-sided weight is greater than threshold and the edge is non-
      empty in the time range
    for each edge (src, dst) in E do
      if (src, dst) is in H then
        remove (src, dst) from H and add to result.relationships
      else
        add (src, dst) to H
      if src not in R then
        add src to U
      if dst not in R then
        add dst to U
  if result is too large then
    set result too large flag and return the current result
return result
```

---

As discussed, in some embodiments, the SAMA system may assign a rank or risk score to each evidence cluster identified security data graph. In some embodiments, the risk scores can be used by a security analyst to prioritize their investigations, to focus on the higher-risk groups first.

In some embodiments, the risk scores for evidence clusters are generated using a Bayesian risk framework. Each evidence cluster is an investigation candidate that carries a certain level of risk of being an actual attack. The complete evaluation of the risk requires an evaluation of the likelihood of the attack and various impact factors, which may be specified as a loss function and/or a characterization of the threat types. In some embodiments, the risk scores may be computed based on a simplified formula that considers only the likelihood of the attack. The formula for the approximate likelihood that an evidence cluster is a cyberattack extends the treatment of a pair of edges connected via a single vertex to a sub-graph.

In some embodiments, several simplifying assumptions are made in deriving the formula. First, it may be assumed that the geometry of the sub-graph in the case of an attack is fixed, in the sense that the alerts, their types, and their connectivity are predetermined by the attack scenario. However, no specific attack scenario is assumed. It is stipulated that in the case of an attack, the alerts and their edges are not independent and are not there by chance. With the fixed geometry of the sub-graph in the case of an attack, the only degree of freedom remaining are the resources (e.g. specific users, roles, computing resources, etc.). It is assumed that any resource within a class can be attacked with equal probability. Thus, the probability for an attack to happen on a given resource instance (e.g. a specific user) is inversely proportional to the number of the resources of that class. Another simplification is the assumption that benign user activities are uncorrelated, at least at the level of triggering security alerts. Thus, in the absence of an attack, all alerts in the sub-graph occur randomly, as do their connections to specific resources. Finally, it may also be assumed that the findings are the only "source" of risk, meaning that a sub-graph without any alerts will be assigned a risk score of zero.

Given these simplifying assumptions, the formula for the risk score may be expressed as a logarithm of the likelihood ratio of the odds that the group of findings is an attack to the odds that the group of findings is random benign activity:

$$\text{Risk}(I) = \ln \Lambda(I(\{x\}_n, \{a\}_k, \{e\}_l)), \tag{19}$$

where $I(\{x\}_n, \{a\}_k, \{e\}_l)$ is the investigation candidate sub-graph consistent of n alerts $\{x\}_n$, k resources $\{a\}_k$, and l edges connecting the alerts and the resources $\{e\}_l$.

The likelihood ratio for the sub-graph is:

$$\Lambda(I(\{x\}_n, \{a\}_k, \{e\}_l)) = \frac{p(\{x\}_n, \{a\}_k, \{e\}_l|1)p(1)}{p(\{x\}_n, \{a\}_k, \{e\}_l|0)p(0)}, \tag{20}$$

which is the ratio of the odds of observing a given sub-graph in the case of an attack versus the odds of observing it in the absence of an attack. Applying the simplifying assumptions about fixed geometry and random choice of resources for the attack to approximate the numerator, and the assumption of statistical independence between findings in the case of benign activity in the denominator, the likelihood ratio can be approximated as:

$$\Lambda(I(\{x\}_n, \{a\}_k, \{e\}_l)) \approx \frac{\prod_{i=1}^{i=k} p(A_i)}{\prod_{i=1}^{i=k} \prod_j p(A_i|e(A, x_j))p(e(A, x_j))}, \tag{21}$$

where the product in the numerator is taken over all of the resource vertices that have alerts attached to them, and the product in the denominator is taken over all of the resources first, and then over all of the alerts attached to that resource.

The last product is equivalent to the product taken over all of the edges connecting the alerts to the resources.

Note that $p(A_i|e(A,x_j))p(e(A,x_j))$ is the probability for the edge from alert $x_j$ to connect to the resource $A_i$. This is a special case of the general formula that was used to specify the edge weights in Equation (1). This is not accidental, since the weights were formulated considering the case of a pair of edges linked to the same vertex, which is a special case of the more general sub-graph considered here. The formula may be factorized to express the logarithm of the likelihood ratio and the risk score in terms of edge weights between the alerts and the resources:

$$\ln \Lambda(I(\{x\}_n, \{a\}_k, \{e\}_l)) = \sum_{i=1}^{i=k}\left(\sum_j w(e(A_i, x_j)) - \frac{1}{2}(m_i - 2)\ln p(A_i)\right), \tag{22}$$

where $w(e(A_i,x_j))$ is the edge weight of the edge between the alert vertex $x_j$ and the resource vertex $A_i$, and $m_i$ is the number of alerts attached to the resource $A_i$.

Taking the logarithm of the likelihood ratio, the products are converted into the sum over resources $A_i$, using the formulation of the one-sided connectivity weight in Equation (6). In the case of the alert vertex, the full edge weight is equal to the one-sided weight of the resource vertex, since the one-sided weight of the alert vertex itself is infinite. This reflects the fact that the edges originated from the findings are related by construction.

Note that to adjust for multiple alerts attached to the same resources, the term $$\frac{1}{2}(m_i - 2)\ln p(A_i)$$

is subtracted from each resource vertex. The subtraction is performed because the weight of each edge contains $\sqrt{p(A_i)}$, whereas the numerator of Equation (21) contains $p(A_i)$ for each resource vertex. If a pair of alerts is connected to the same resource vertex, no adjustment is needed. In all other cases, the correction is needed for missing (in the case of a single alert attached to the resource) or extra (in the case of more than two alerts attached to the resources) by either adding or subtracting the appropriate number of $\ln p(A_i)$ terms.

Approximating, as before, $p(A_i)$ to be inversely proportional to the number of resources of that class:

$$p(A_i) = \frac{1}{n_A}, \tag{23}$$

the risk score may be expressed as:

$$\text{Risk}(I) = \sum_{i=1}^{i=k}(\text{Risk}(A_i)), \tag{24}$$

where $\text{Risk}(A_i)$ is the risk score for resource $A_i$, given by:

$$\text{Risk}(A_i) = \sum_j w(e(A_i, x_j)) + \frac{1}{2}(m_i - 2)\ln n_A. \tag{25}$$

In practice, the risk score formulated by Equations (24) and (25) can be efficiently evaluated by first computing the risk score for each resource vertex, and then summing them all up for each sub-graph I. In rare cases, typically when a resource has only a single alert attached to it, the risk of the resource's vertex can become negative. In this case, the risk score of the resource $Risk(A_j)$ may be set to zero, which enforces the requirement for non-negative risk introduced by the alerts. This is a valid procedure, since in deriving the formula for the weights we used the Poisson formula, Equation (7), and a subsequent approximation that is valid for small rates of events:

$$\ln p = \ln(1-\exp(-R)) \approx \ln R \text{ if } R \ll 1. \tag{26}$$

This approximation makes sense when considering the rate of alerts for a given resource, since it is roughly proportional to the number of alerts observed per day in the entire network divided by total number of resources of a given class. However, when considering all sub-graphs, a single alert attached to a resource is not as rare. Hence, after adjusting for this by subtracting $\ln n_A$, the equivalent rate in the Poisson formula is no longer small, and linear approximation is no longer valid. In the case of a high rate of events, the Poisson formula is approximated by:

$$\ln p = \ln(1-\exp(-R)) \approx 0 \text{ if } R \gg 1, \tag{27}$$

which leads to a zero log-likelihood ratio.

In some embodiments, the described risk score may be used to rank evidence clusters when they are presented to security analysts. While this risk score does not capture all relevant factors, it is easy to interpret and compute, and it provides a useful metric for evaluating how unlikely a given group of alerts is to arise by random chance. It noted that depending on the embodiment, the SAMA system may use other types of risk scores different from the risk score shown above, for example, to take into account factors such as the potential severity of the alerts and their impact or the value of a given resource, etc.

In some embodiments, each resource may be assigned a risk score based on the combined weights of the alerts attached to it. The resource risk score accounts for the variation in the rarity of different alerts and the prior history of the resource. The score will be higher for rare alerts and for resources that previously were not involved in activities that triggered alerts. This score also accounts for chance coincidence of multiple alerts connecting to the same resource. The risk grows in proportion to the number of alerts (note that since the risk score is logarithm of the likelihood ratio, the ratio of odds grows exponentially). The same logic applies when the risk is summed over the resources connected into a sub-graph. The sub-graphs with a large number of resources of high risk receive proportionally higher overall risk scores.

Figure 4:
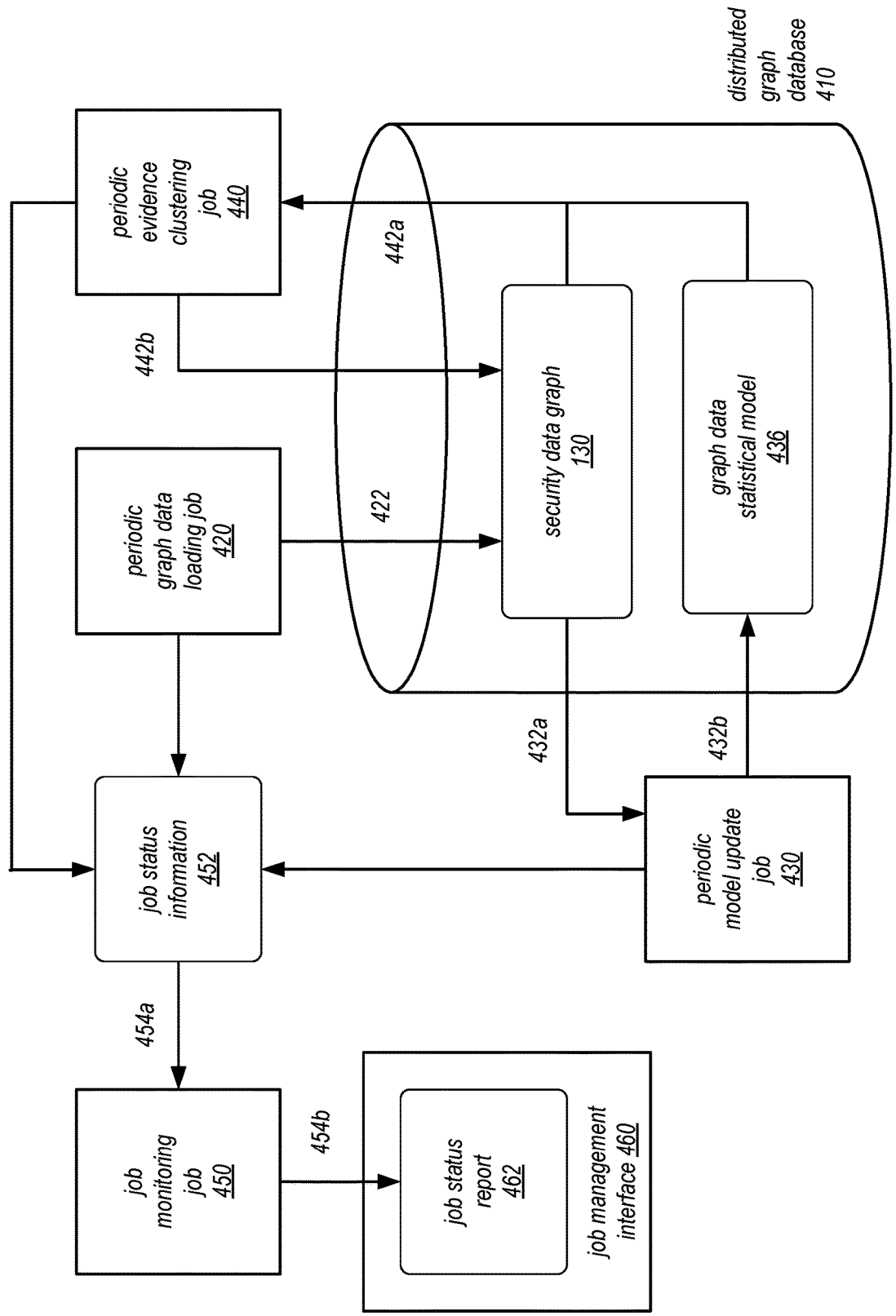
FIG. 4 illustrates different types of jobs performed by the SAMA system to periodically identify clusters or causally related evidence pertaining to cyberattacks, according to some embodiments.

FIG. 4 illustrates different types of jobs performed by the SAMA system to periodically identify clusters or causally related evidence pertaining to cyberattacks, according to some embodiments.

As shown, aspects of the meta-analysis performed by the system may be implemented as different types of jobs in the system, which may be executed periodically and asynchronously from one another. In this example, the job types include a periodic graph data loading job 420, a periodic model update job 430, a periodic evidence clustering job 440, and a (possibly periodic) job monitoring job 450. In some embodiments, each of these job types may have its own execution schedule, which may be configurable and stored as part of the job configuration information 242. For example, the graph data loading job 420 and evidence clustering job 440 may be scheduled to execute once a day, while the model update job 430 may be configured to execute more slowly, once a week. In some embodiments, the SAMA system may implement a job management interface that allows users to initiate, stop, or otherwise control these jobs on demand. In some embodiments, the SAMA system may execute a large number of these jobs in parallel on many computer networks being monitored by the SAMA system.

As shown, some of the jobs are configured to read and/or write the security data graph 130, which may be stored in a graph database. In some embodiments, the graph database may be a distributed graph database 410 that stores graph data across a number of distinct storage locations or storage nodes. In some embodiments, the distributed graph database 410 may be implemented on a distributed file system such as APACHE HDFS. In some embodiments, the distributed graph database 410 may be the SQRRL graph database. As discussed, the jobs themselves may be executed using a cluster of compute nodes, and individual compute nodes may be assigned a different portion of the security data graph in the distributed graph database. In some embodiments, the cluster of compute nodes may be a SPARK cluster, which may be programmed according to the MAPREDUCE framework.

In some embodiments, the graph data loading job 420 is tasked with obtaining or consuming various types of security data 112 generated by upstream security monitoring systems 110, transforming the data into a normalized form, and loading 422 the data into the graph database 410. In some embodiments, these loading jobs may be implemented using an Extract, Transform, and Load tool that is configured to work with the graph database. In some embodiments, the ETL tool may be used to implement all reading and writing to/from the graph database. Any data analytic functionality may be performed on data files generated by the ETL tool, so that the data analytic functionality is decoupled or abstracted away from the particular graph database.

In some embodiments, the model update job 430 is tasked with reading 432*a* the graph data in the security data graph 130 and updating 432*b* a graph data statistical model 436. As discussed, the statistical data stored or generated by the model 436 may be used during the graph edge filtering process, in some embodiments. The graph data statistical model 436 may be stored in the graph database 410 or in a repository separate from the graph database. In some embodiments, the statistical model 436 may implement a function that predicts statistics of the security data graph based on input parameters such as time of day, day of week, etc. In some embodiments, the model update may be implemented as part of a machine learning process that gradually adapts the model to the changing nature of the monitored network.

In some embodiments, the evidence clustering job 440 is tasked with analyzing 442*a* the security data graph 130 and graph data statistical model 436 to generate 442*b* evidence clusters. The evidence clustering process may implement the edge filtering and risk score calculation algorithms discussed previously in connection with FIGS. 3A-3B. As shown, in some embodiments, the results of the analysis are written back 442*b* to the graph database 410, so that the results can be used by later iterations of the jobs and/or other downstream meta-analysis processes.

In some embodiments, the different jobs 420, 430, and 440 may generate job status information 452, which may be stored as data objects or files in a data repository separate from the graph database 410. Depending on the embodiment, the job status information 452 may include information such as the current status of job instances, job activity logs, and job metrics, etc. For example, the job status may indicate whether a job is scheduled, currently executing, completed, or failed. In some embodiments, the job status information may indicate the progress of a job (e.g. a percentage to completion). The job activity logs may indicate timestamped actions performed by each job, such as initiation and completion of individual stages within the job, errors encountered by the job, or retry attempts made by the job, etc. The job metrics may include information such as job run time, number of reads/writes performed per job, etc.

In some embodiments, the job monitoring job 450 will consume 454*a* the job status information 452 and generate 454*b* a job status report 462 via a job management interface 460. This report 462 may be generated periodically according to a schedule, or on-demand in response to user commands. In some embodiments, the job status report 462 may be generated in real-time or near-real-time, so that the job management interface 460 can be continuously updated to provide the most up-to-date information about the jobs.

In some embodiments, the job monitoring job 450 may be configured to generate real-time alerts based on the job status information 452. The alerts may be generated according to user-configured alarm rules and presented via the job management interface 460. For example, alarms may be generated if there are too many executing or scheduled jobs in the system, if one or more job queues in the system are nearing capacity or overflowing, if a particular job is taking too long or being run too frequently, or if a particular job is experiencing too many errors or making too many retry attempts. In some embodiments, the job management interface 460 may provide control elements that allows an administrator to manually control the jobs, including starting, stopping, pausing, and resuming of jobs.

In some embodiments, the job monitoring job 450 may aggregate job status information 452 generated over time to produce aggregate performance reports. Such performance reports may be generated for an individual security data graph, a group of graphs, over a particular time period, etc. The performance reports may indicate performance metrics such as resource usage and contention, average job run times, number of simultaneously running jobs in the system or active graphs in the system, statistics on various types of errors, etc. Such performance metrics may be used to make management decisions about job deployments in the system.

Figure 5:
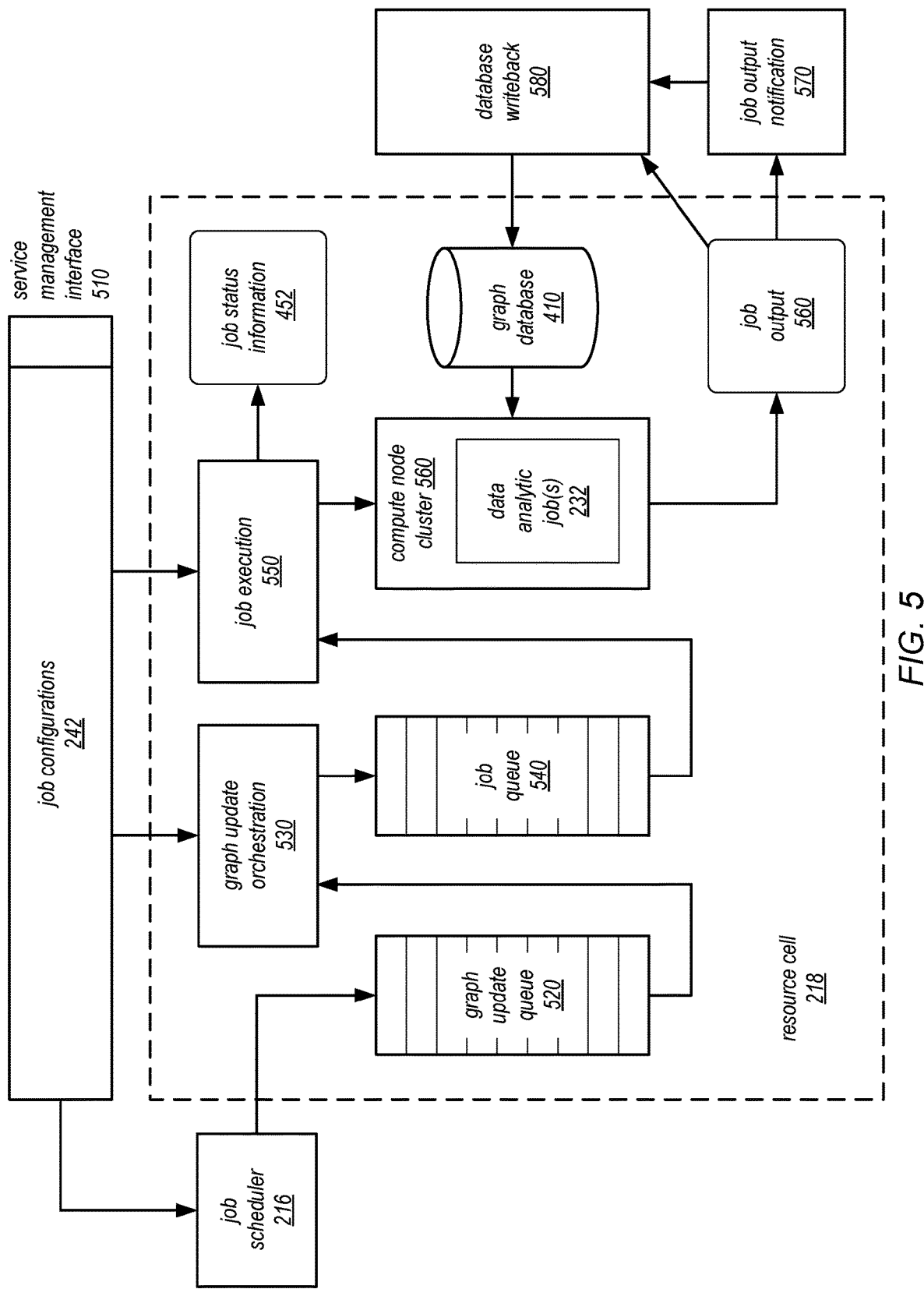
FIG. 5 illustrates components of the SAMA system used to schedule and execute data analytic jobs, according to some embodiments.

FIG. 5 illustrates components of the SAMA system used to schedule and execute data analytic jobs, according to some embodiments.

As shown, the figure depicts components of an example SAMA system used to execute jobs in the system (e.g. jobs 420, 430, 440, and 450 of FIG. 4). As shown, some of the system components are reproduced in independently operating resource cells 218, while other components are implemented outside the resource cells. However, the placement of these components is a matter of design choice, which may be varied based on embodiment.

As shown, in some embodiments, the SAMA system provides a service management interface 510 to allow administrators of the system to update the job configuration 242 of jobs in the system. The job configurations 242 may contain information that controls the operations of the job scheduler 216, a graph update orchestration component 530, and a job execution component 550.

In some embodiments, the job scheduler 216 is a regional component external to the resource cells. In some embodiments, it is implemented as a serverless function executable by a serverless execution service. In some embodiments, the scheduler may run periodically (e.g. every 10 minutes). The scheduler may obtain a list of all active security data graphs in its region and generate an update request for each graph (specifying the graph ID) into the graph update queue 520 of the cell assigned to the graph. Thus, in theory, the graph data should be refreshed every 10 minutes. In some embodiments, the refresh period is kept relatively short to facilitate re-running failed jobs when appropriate.

In some embodiments, the graph update orchestration component 530 is another serverless function, configured to initiate jobs for a graph update request. In some embodiments, the graph update orchestration component 530 is triggered by pending requests in the graph update queue 520. The orchestration component will iterate over the job configurations 242 and determine which types of jobs are due for the graph. The orchestration component may rely on the job status information 452 to determine which jobs are due. For example, in some embodiments, the orchestrator will schedule a job right away if a previous run of the job failed for a reason that is considered retriable. In some embodiments, the orchestrator may not schedule a new job run if another job is currently running on the graph. To schedule a job run, the orchestration component will issue a job run request to the job queue 540, the request specifying a graph ID and a job ID, and various input parameters for the job as appropriate. In some embodiments, the input parameters may specify operational parameters of the job, such as how many worker nodes to use, etc.

In some embodiments, the job execution component 550 is another serverless function that is triggered by pending job run requests in the job queue 540. The job execution component 550 will look up the configurations of a particular data analytic job 232 in the job configuration information 242 and execute the job using the resources in the resource cell (e.g. by invoking functions via one or more APIs associated with an ETL tool or the compute node cluster 560). In some embodiments, if a requested job is already running, the job executor will simply return successfully. As shown, in some embodiments, the job status information 452 is generated by the job execution component 550.

Depending on the type of job, the data analytic job(s) 232 may interact with the graph database 410 to, for example, extract graph data from the security data graph identified by the graph ID, and perform various analytical processes such as identifying evidence clusters. In some embodiments, the output 560 of the data analytic jobs may be initially stored outside of the graph database, for example, in a file or object repository. In some embodiments, this output 560 is used to generate the periodic grouped evidence reports 162 to the user interface of the SAMA system.

In some embodiments, the job output 560 will cause a job output notification component 570 to issue notifications to subscribed components, such as a security analyst user interface or a database writeback component 580. In some embodiments, the database writeback component 580, which may be another serverless function, will transform the job output into a format suitable for the graph database 410 and load the output data back into the database. In some embodiments, the database writeback component 580 may be implemented outside the resource cell 218, because it is not a time-sensitive process and can be performed more efficiently in bulk fashion by a centralized component.

As discussed, the job configuration 242 may be used to specify various aspects of the job execution process. In some embodiments, each job type is identified by a unique job ID.

The job configuration for an individual job type may include parameters such as the run frequency, maximum run time, a formula or policy for determining the number of worker nodes to use (e.g. based on the graph's size), etc. By default, a job is executable on all active graphs. However, in some embodiments, the job configuration may specify a list of graph IDs on which the job can be run (e.g. for an opt-in scenario), or a list of graph IDs that the job cannot be run on (e.g. in an opt-out scenario).

In some embodiments, the job configuration 242 may include the code that implements individual job types. For example, the configuration 242 may point to invocation code (e.g. a Scala class or script) that is used to launch a type of job. The invocation code may perform tasks such as setting up the execution environment (e.g. deploying the appropriate resources and establishing network connections), and invoking the actual code that implements the logic of the job in the execution environment. In some embodiments, the code for each job type may be stored as individually deployable data containers (e.g. jar files). The execution framework does not depend on the specifics of any particular job type. New types of jobs may be easily added to the system by inserting a new job type data container, without having to reprogram the execution framework.

FIGS. 6A to 6C illustrate a user interface that reports clusters or causally related evidence pertaining to cyberattacks identified by the SAMA system, according to some embodiments.

FIG. 6A illustrates an example daily report GUI 610 implemented by the SAMA system 120. As shown, the report may be presented on a graphical user interface, which may be part of a security analyst console. In some embodiments, the GUI 610 may be a browser-based interface displayed on a web browser. The report may be generated daily to allow security analysts monitoring the network to investigate the evidence clusters identified by the SAMA system.

As shown, the top portion of the GUI displays a report summary 620, which indicates various summary information about the evidence clusters listed in the daily report. The bottom portion of the GUI provides a listing 630 of the evidence clusters for the day. As shown, the listing shows various attributes of each evidence cluster, including accounts/resources involved, when the cluster was observed, the time of a last change in the cluster, the number of alerts involved, the assigned risk score, the analyst(s) assigned to investigate the cluster, and the current investigation status of the cluster. As shown, the GUI provides buttons 632 and 634 to allow the user to sort and filter the listing 630 based on different cluster attributes. For example, the listing may be sorted according to the risk score, so that higher-risk clusters are seen first. Depending on the embodiment, the listed evidence clusters may be sorted or filtered based on cluster attributes such as the number of entities in the evidence clusters, the number of security alerts in the evidence clusters, the start times of the evidence clusters, and the durations of the evidence clusters, etc.

The investigate button 636 allows the analyst to see a more detailed view of a selected evidence cluster in the listing. In some embodiments, the investigation view may allow analysts to change the metadata associated with the evidence cluster, such as the cluster's display name.

As shown, the listing includes some evidence clusters (last two clusters) that have lasted for more than one day. In some embodiments, the SAMA system may allow security analysts to monitor an evidence cluster beyond the normal reporting period, so that additional alerts that arise in subsequent periods can be added to the initially identified cluster. This feature allows analysts to track an evidence cluster over multiple reporting periods to monitor how the cluster develops over time.

FIG. 6B shows additional information provided by the GUI 610. As shown, in some embodiments, the evidence cluster listing 630 may display additional information about a listed cluster selected by the user (e.g. when the user hovers the pointer over a field of the cluster). In this example, the hovering causes a popup 640 to be displayed, showing the accounts and resources that were involved in the security alerts in the cluster. FIG. 6C shows yet more information provided by the GUI. As shown, when the user hovers over the alerts field of the first cluster, a popup 650 is displayed, showing the security alerts in the cluster ordered by time of occurrence.

Figure 7:
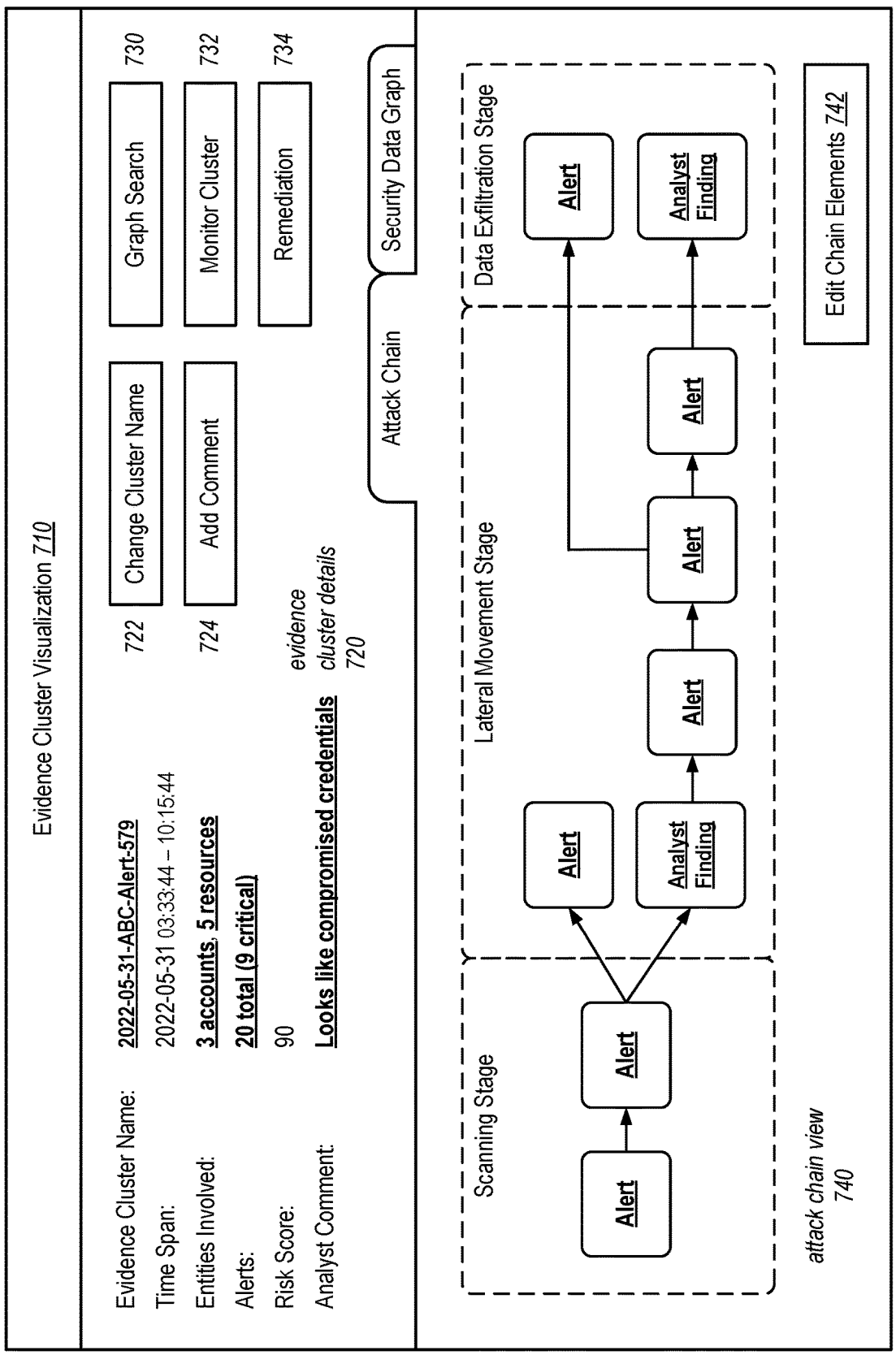
FIG. 7 illustrates a user interface that provides different ways to visualize clusters of evidence pertaining to cyberattacks identified by the SAMA system, according to some embodiments.

FIG. 7 illustrates a user interface that provides different ways to visualize clusters of evidence pertaining to cyberattacks identified by the SAMA system, according to some embodiments.

The figure shows an evidence cluster visualization GUI 710 of the SAMA system that allows security analysts to view details about a particular evidence cluster and visualize the cluster in different ways. GUI 710 may be generated when the investigate button 636 on GUI 610 is pressed.

As shown, the top portion of the GUI 710 indicates various details 720 about the evidence cluster. Some of the detailed information, such as the cluster name and the analyst comment, can be modified by the analyst using buttons 722 and 724.

As shown, the GUI 710 includes other control elements that allow the security analysts to take various actions during the investigation of the cluster. Button 730 allows the security analyst to perform a graph search, for example, using the on-demand cluster identification algorithm discussed previously. The graph search may be performed around one or more seed vertices in the identified sub-graph, to discover a different (possibly larger) sub-graph of causally related security alerts and resources. In some embodiments, the GUI may allow analysts to specify a different edge or vertex evaluation or filtering criteria for the graph search. For example, the graph search request may specify that the search can span multiple days, include more resource or alert types, or use a different edge weight formula.

In some embodiments, the monitor cluster button 732 allows the analyst to begin monitoring the evidence cluster over subsequent reporting periods, so that the sub-graph associated with the cluster is maintained and updated in successive reporting periods (e.g. to update the graph with additional security alerts). For example, a particularly interesting cluster first detected on Monday may be monitored, so that the analyst can track how the cluster grows (or shrinks) over the next days of the week.

In some embodiments, the GUI 710 may provide a remediation button 734 that allows security analysts to initiate one or more remediation actions in response to a suspected cyberattack. Such remediation actions may include, for example, isolating one or more affected resources from the rest of the network, reconfiguring the affected resources to disable the attack, warning or revoking access from one or more involved users, or escalating the investigation to other security analysts or more sophisticated analytic tools, etc.

As shown, the bottom portion of the GUI 710 provides two different ways of visualizing the evidence cluster. The security data graph tab allows security analysts to view the security data graph of the evidence cluster. For example, the graph view may be used by the user to initiate a graph search. The GUI also provides an attack chain view 740 of the evidence cluster, as shown. In this view, the security alerts in the evidence cluster are interpreted and classified into respective attack stages in the suspected attack. This classification may be performed based on the type of the individual alerts, subsequent log data captured following the alert, among other factors. Additionally, the attack chain view links different ones of the security alerts to provide a causal chain among the alerts. In some embodiments, these links may be inferred based on the timing of the alerts and on known patterns of cyberattacks TTPs obtained from threat intelligence sources.

Finally, button 742 allows security analysts to make manual edits to the attack chain to, for example, move chain elements between different attack stages, rearrange the links in the attack chain, or insert new chain elements into the chain (e.g. analyst finding elements). In some embodiments, analyst findings may be used to indicate events that are observed in the log data but did not trigger a security alert. For example, in some situations, an event that appeared to be benign when seen in isolation may be recognized as a significant attack step when viewed in the context of the entire evidence cluster. The analysts may add such events to the attack chain during his or her investigation to provide a better picture of the attack.

Figure 8:
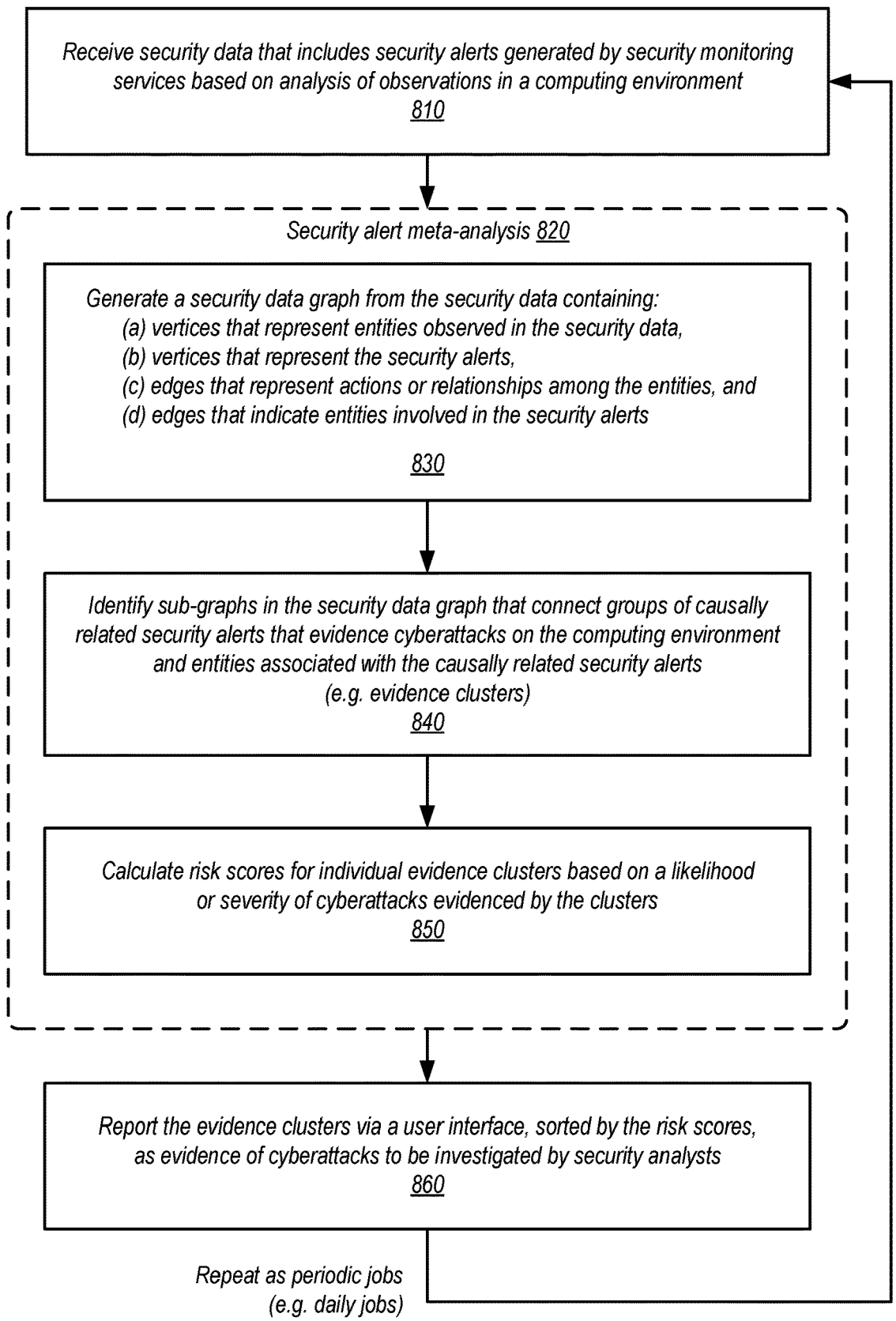
FIG. 8 is a flowchart illustrating a process of the SAMA system generating a report of clusters or causally related evidence pertaining to cyberattacks, according to some embodiments.

FIG. 8 is a flowchart illustrating a process of the SAMA system generating a report of clusters or causally related evidence pertaining to cyberattacks, according to some embodiments.

The process begins at operation 810, where security data 112 is received by the SAMA system 120. The security data may include observation data collected from a monitored computing environment and security alerts 114 generated by upstream security monitoring services 110. The security monitoring services may perform a first-tier analysis of the observations to generate the security alerts. The security data may be received as log files or extracted from data repositories used by the security monitoring services.

As shown, operations 830, 840, and 850 are performed as part of a security alerte meta-analysis 820 performed by the SAMA system. At operation 830, the SAMA system generates a security data graph 130 from the security data. The security data graph may include vertices that represent entities observed in the security data (e.g. user accounts, roles, computing resources, IP addresses, DNS names, geo-locations, etc.), as well as the security alerts generated by the upstream security monitoring services. The edges in the security data graph link the entities based on their relationships and interactions, and also the security alerts to the entities that were involved in the alerts. In some embodiments, the security data graph may be generated in time slices for successive time periods (e.g. daily), and stored in a graph database 410. In some embodiments, separate graphs will be generated for different monitored computer networks.

At operation 840, the SAMA system identifies sub-graphs in the security data graph to capture groups or clusters of causally related evidence of attacks. The sub-graph, which also includes entities associated with the alerts, represents an evidence cluster of the attack that will be presented to security analysts. In some embodiments, the sub-graph(s) are identified by filtering the edges in the security data graph to remove those associations that are not likely to indicate an attack. In some embodiments, the sub-graph may be identified in response to a graph search request from a user that specifies one or more seed vertices in the security data graph as the starting point for the search.

At operation 850, risk scores are calculated for individual ones of the evidence clusters. The risk scores may be calculated based on a likelihood of the evidence attack or a severity of the evidence attack. The risk scores may be normalized across one security data graph or longer time periods. In some embodiments, the output of operations 840 and 850 are written back into the security data graph, so that these results may be used by later iterations of the meta-analysis or downstream analysis processes.

At operation 860, the evidence clusters are reported via a user interface 160, such as a console interface used by security analysts. The user interface may allow the evidence clusters to be sorted by the risk scores or other attributes of the clusters. The user interface allows the security analyst to view the causally related security alerts as a group and to investigate the underlying details about the alerts and resources associated with the alerts. Examples of the user interface are shown in FIGS. 6A-6C and 7.

As shown, in some embodiments, the process may be repeated as periodic jobs (e.g. daily jobs), as discussed in connection with FIGS. 4 and 5. For example, the SAMA system may be used to generate daily reports of detected evidence clusters for the monitored network, to be investigated by the security analysts.

Figure 9:
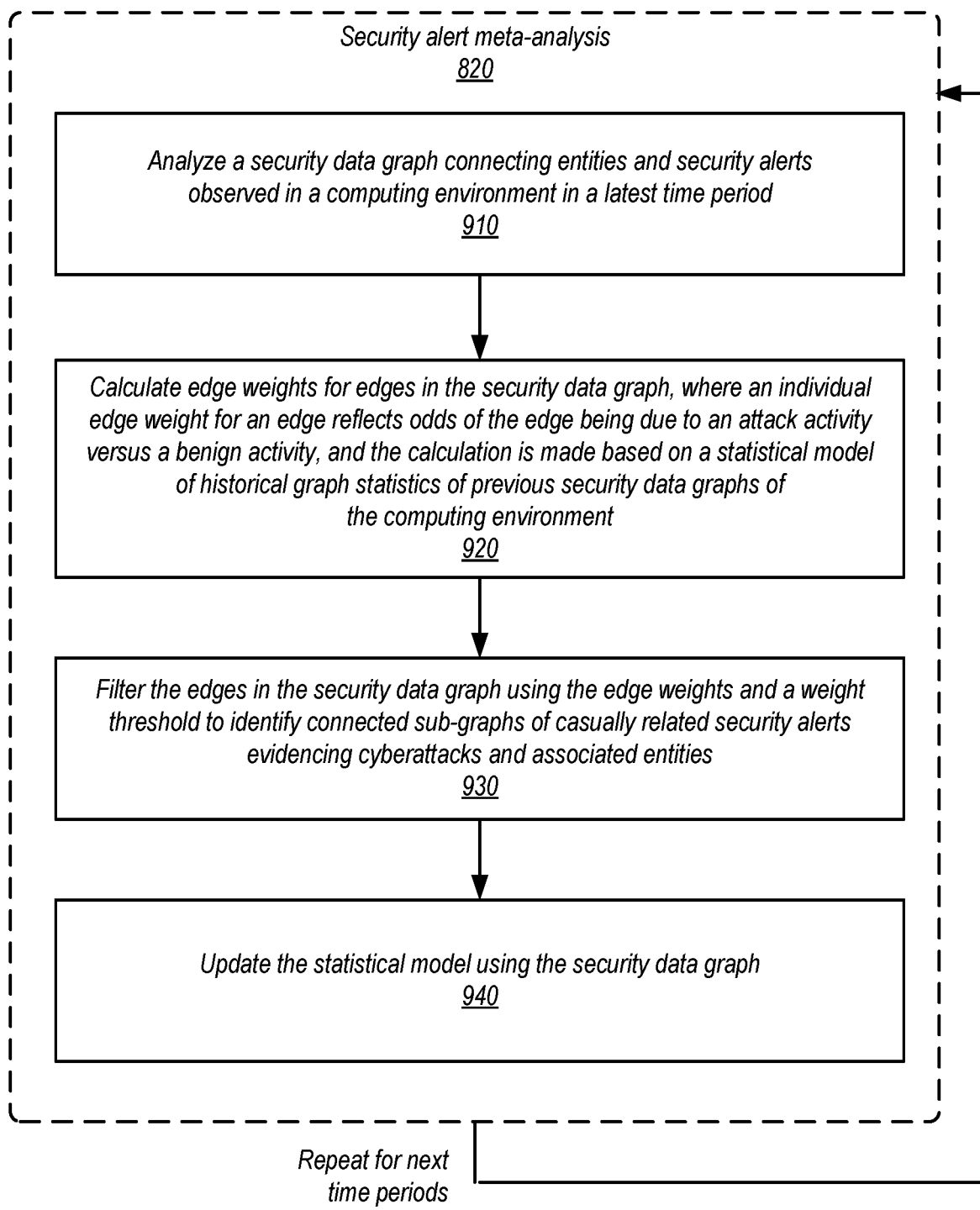
FIG. 9 is a flowchart illustrating a security alert meta-analysis process performed by SAMA system, according to some embodiments.

FIG. 9 is a flowchart illustrating a security alert meta-analysis process performed by SAMA system, according to some embodiments. As shown, the operations shown in the figure may be performed as part of the security alert meta-analysis process 820 discussed in connection with FIG. 8.

At operation 910, the SAMA system receives and analyzes a security data graph 130 connecting entities and security alerts observed in a computing environment 100 in a latest time period (e.g. in the previous day). In some embodiments, the security data graph may be built daily using a component such as the security data graph builder 122.

At operation 920, edge weights 370 are calculated for edges in the security data graph. In some embodiments, an individual edge weight for an edge may reflect the odds that the edge is due to an attack activity versus a benign activity. In some embodiments, the calculation may be made based on a statistical model 436 of historical graph statistics of previous security data graphs generated for the computing environment. In some embodiments, the edge weights may be calculated in the manner discussed in connection with FIGS. 3A-3B.

At operation 930, the edges in the security data graph are filtered using the edge weights and a weight threshold, to identify connected sub-graphs 142 of causally related security alerts evidencing cyberattacks. The sub-graphs are connected by those edges of the security data graph that remain after the filtering. The sub-graphs may include the related alerts themselves and also the entities involved in the alerts. In some embodiments, the edge filtering may be performed in the manner discussed in connection with FIGS. 3A-3B.

At operation 940, the statistical model 436 of historical graph statistics is updated based on the security data graph generated for the last time period. In some embodiments, the statistical model may be updated in a separate process from the sub-graph identification process, for example, as a separate model update job 430. In some embodiments, the statistical model may be updated as part of a machine learning process that adapts the model to the observational changes in the monitored computing environment. As shown, the security alert meta-analysis process may be repeated for successive time periods, to continually analyze new security data graphs and update the statistical model of graph data.

Figure 10:
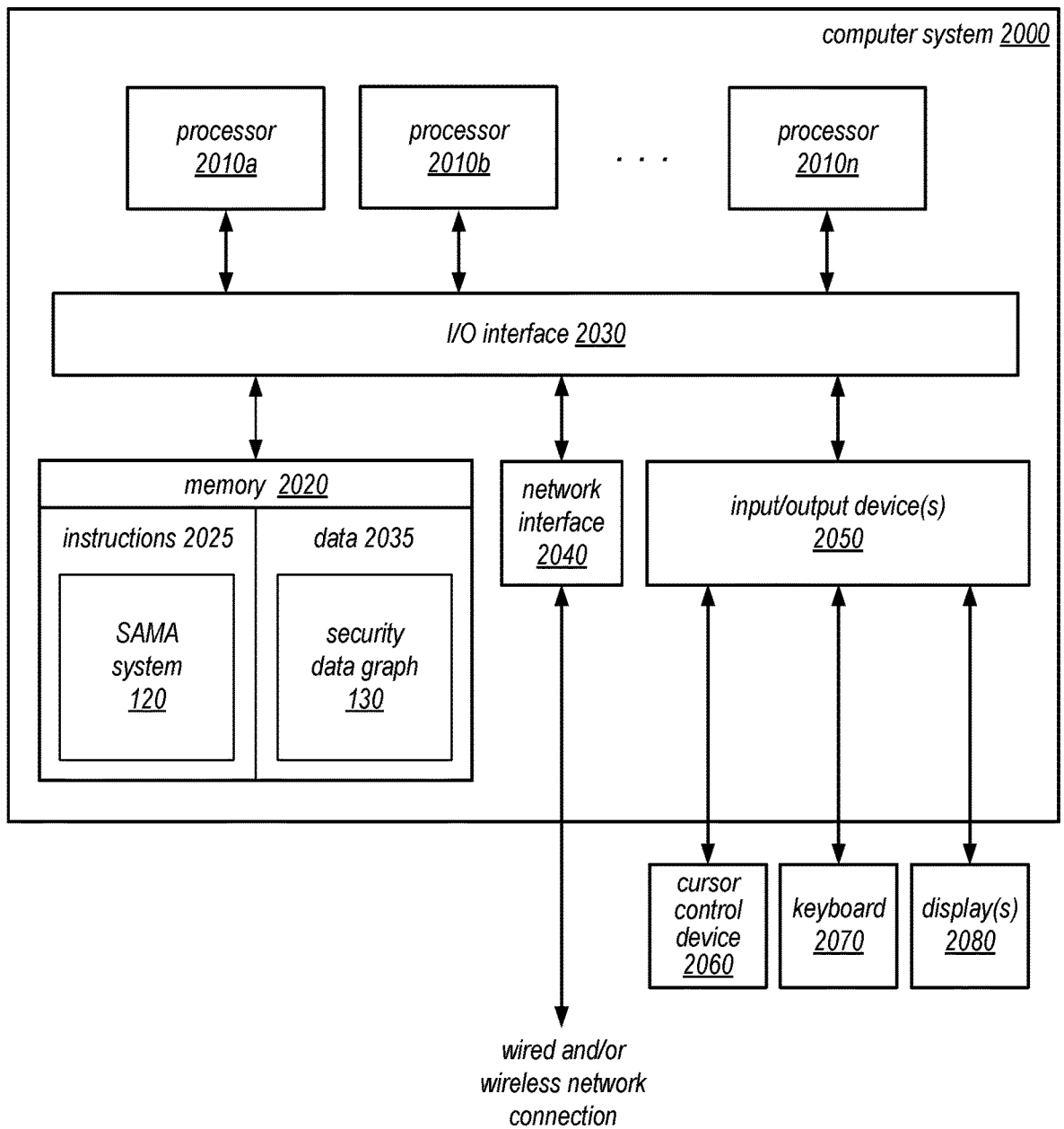
FIG. 10 illustrates an example computer system that implements portions of the SAMA system described herein, according to some embodiments.

FIG. 10 illustrates an example computer system that implements portions of the SAMA system described herein, according to some embodiments.

In different embodiments, computer system 2000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, computing system compute system, or electronic device.

In the illustrated embodiment, computer system 2000 includes one or more processors 2010 coupled to a system memory 2020 via an input/output (I/O) interface 2030. Computer system 2000 further includes a network interface 2040 coupled to I/O interface 2030, and one or more input/output devices 2050, such as cursor control device 2060, keyboard 2070, and display(s) 2080. Display(s) 2080 may include standard computer monitor(s) and/or other display systems, technologies or devices. In at least some implementations, the input/output devices 2050 may also include a touch- or multi-touch enabled device such as a pad or tablet via which a user enters input via a stylus-type device and/or one or more digits. In some embodiments, it is contemplated that embodiments may be implemented using a single instance of computer system 2000, while in other embodiments multiple such systems, or multiple nodes making up computer system 2000, may host different portions or instances of embodiments. For example, in one embodiment some elements may be implemented via one or more nodes of computer system 2000 that are distinct from those nodes implementing other elements.

In various embodiments, computer system 2000 may be a uniprocessor system including one processor 2010, or a multiprocessor system including several processors 2010 (e.g., two, four, eight, or another suitable number). Processors 2010 may be any suitable processor capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA.

In some embodiments, at least one processor 2010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 2020 may store program instructions and/or data accessible by processor 2010. In various embodiments, system memory 2020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above are shown stored within system memory 2020 as program instructions 2025 and data storage 2035, respectively. In other embodiments, program instructions and/or data may be received, sent or stored upon different types of computer-accessible media or on similar media separate from system memory 2020 or computer system 2000. Generally speaking, a non-transitory, computer-readable storage medium may include storage media or memory media such as magnetic or optical media, e.g., disk or CD/DVD-ROM coupled to computer system 2000 via I/O interface 2030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 2040.

In one embodiment, I/O interface 2030 may coordinate I/O traffic between processor 2010, system memory 2020, and any peripheral devices in the device, including network interface 2040 or other peripheral interfaces, such as input/output devices 2050. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. In addition, in some embodiments some or all of the functionality of I/O interface 2030, such as an interface to system memory 2020, may be incorporated directly into processor 2010.

Network interface 2040 may allow data to be exchanged between computer system 2000 and other devices attached to a network, such as other computer systems, or between nodes of computer system 2000. In various embodiments, network interface 2040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of computer system 2000. In some embodiments, similar input/output devices may be separate from computer system 2000 and may interact with one or more nodes of computer system 2000 through a wired or wireless connection, such as over network interface 2040.

As shown, memory 2020 may include program instructions 2025, may implement the various methods and techniques as described herein, and data storage 2035, comprising various data accessible by program instructions 2025. In one embodiment, program instructions 2025 may include software elements of embodiments as described herein and as illustrated in the figures. For example, the program instructions 2025 may be used to implement the functions of the SAMA system 120. Data storage 2035 may include data that may be used in embodiments. For example, the data store 2035 may be used to store the security data graph 130. In other embodiments, other or different software elements and data may be included.

Those skilled in the art will appreciate that computer system 2000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 2000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 2000 may be transmitted to computer system 2000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. For example, leader nodes within a data warehouse system may present data storage services and/or database services to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may define various operations that other systems may invoke, and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention encompasses all such modifications and changes and, accordingly, the above description to be regarded in an illustrative rather than a restrictive sense.

What is claimed is:

1. A system, comprising:
one or more computing devices that implement a security alert meta-analysis (SAMA) system, configured to:
receive security data about a computing environment of networked computing resources that includes a first type of monitoring service that generates a first type of security alert about the computing environment of networked computing resources and a second type of monitoring service that generates a second type of security alert about the computing environment of networked computing resources,
wherein the first type of monitoring service and the second type of monitoring service independently collect security data from at least one or more data collecting agents or sensors operating in the computing environment, and wherein the first type of security alert and the second type of security alert are generated after the first and second types of monitoring services independently perform a first-tier analysis of the independently collected security data, and the analysis identifies an event or condition in the computing environment;

perform a meta-analysis of the first and second types of security alerts generated by the first and second types of monitoring services, including to:

generate a security data graph from the security data, wherein the security data graph contains (a) a first set of vertices that represent entities observed in the security data, (b) a second set of vertices that represent the security alerts generated by the first and second types of monitoring services, (c) a first set of edges that represent actions or relationships among the entities, and (d) a second set of edges that indicate entities involved in the security alerts generated by the first and second types of monitoring services, wherein the entities include different types of resources, accounts, or observations in the computing environment; and identify at least one sub-graph of the security data graph, where the sub-graph connects a group of causally related security alerts that evidence a cyberattack on the computing environment and entities associated with the causally related security alerts; and generate, via a user interface, a report that indicates the group of causally related security alerts and associated entities as evidence of the cyberattack, wherein the report reduces a number of false positives in the security alerts generated by the first and second types of security monitoring services.

2. The system of claim 1, wherein:
the SAMA system is implemented as part of a network-accessible provider service that hosts client networks on behalf of a plurality of clients;
the security monitoring services are implemented as part of the network-accessible provider service and configured to generate the security data based at least in part on monitoring of the client networks; and
the SAMA system is configured to perform the meta-analysis on individual ones of the client networks using security data of individual ones of the client networks.

3. The system of claim 1, wherein: the report includes an attack chain view that organizes the causally related security alerts into a plurality of attack stages.

4. The system of claim 1, wherein the SAMA system is configured to:
repeatedly generate security data graphs of the computing environment for successive time periods in a distributed graph database; and
schedule a data analytics job to perform the meta-analysis on a most recent security data graph, wherein the data analytics job is executed by a cluster of compute nodes to process respective portions of the most recent security data graph in parallel.

5. The system of claim 1, wherein the SAMA system is configured to:
identify multiple sub-graphs of causally related security alerts and associated entities as multiple evidence clusters of cyberattacks during the meta-analysis of the security data graph;

calculate risk scores for individual ones of the multiple evidence clusters based at least in part on a likelihood or severity of respective evidenced cyberattacks; and
report, via the user interface, the multiple evidence clusters with the risk scores, wherein the evidence clusters are ranked according to the risk scores.

6. The system of claim 1, wherein vertices in the security data graph indicate entity types of the entities, the entity types including two or more of:
a client account,
a user account,
an Identity and Access Management (IAM) role,
a role session,
an Internet Protocol (IP) address,
a Domain Name System (DNS) domain, and
a geographic location.

7. A method, comprising:
performing, by a security alert meta-analysis (SAMA) system implemented by one or more computing devices:
receiving security data about a computing environment that includes a first type of monitoring service that generates a first type of security alert about the computing environment of networked computing resources and a second type of monitoring service that generates a second type of security alert about the computing environment of networked computing resources,
wherein the first type of monitoring service and the second type of monitoring service independently collect security data from at least one or more data collecting agents or sensors operating in the computing environment, and
wherein the first type of security alert and the second type of security alert are generated after the first and second types of monitoring services independently perform a first-tier analysis of the independently collected security data, and the analysis identifies an event or condition in the computing environment;
performing a meta-analysis of the first and second types of security alerts generated by the first and second types of monitoring services, including:
generating a security data graph from the security data, wherein the security data graph contains (a) a first set of vertices that represent entities observed in the security data, (b) a second set of vertices that represent the security alerts generated by the first and second types of monitoring services, (c) a first set of edges that represent actions or relationships among the entities, and (d) a second set of edges that indicate entities involved in the security alerts generated by the first and second types of monitoring services, wherein the entities include different types of resources, accounts, or observations in the computing environments; and
identifying at least one sub-graph of the security data graph, where the sub-graph connects a group of causally related security alerts that evidence a cyberattack on the computing environment and entities associated with the causally related security alerts; and
generating, via a user interface, a report that indicates the group of causally related security alerts and associated entities as evidence of the cyberattack, wherein the report reduces a number of false positives in the security alerts generated by the first and second types of security monitoring services.

8. The method of claim 7, wherein:
the SAMA system is configured to assign individual client networks to different resource cells; and
an individual resource cell is configured to perform the meta-analysis on security data of an individual client network independently from other resource cells.

9. The method of claim 8, further comprising the SAMA system:
reporting, via the user interface, multiple evidence clusters of causally related security alerts and associated entities identified in the security data graph; and
responsive to user input received via the user interface, changing a sort order of the multiple evidence clusters on the user interface based on different attributes of the evidence clusters, the different attributes including two or more of:
a risk score associated with an evidence cluster,
a number of entities in the evidence cluster,
a number of security alerts in the evidence cluster,
a starting time of the evidence cluster, and
a duration of the evidence cluster.

10. The method of claim 7, further comprising the SAMA system:
storing the security data graph in a distributed graph database; and
scheduling a data analytics job to perform the meta-analysis on the security data graph, wherein the data analytics job is executed by a cluster of compute nodes to process respective portions of the security data graph in parallel.

11. The method of claim 10, further comprising the SAMA system:
monitoring execution of the data analytics job to determine job status information; and
reporting the job status information on a job management interface during the execution of the data analytics job.

12. The method of claim 8, further comprising the SAMA system:
assigning that individual security alerts in the group to respective stages of the cyberattack; and
displaying, via the user interface, an attack chain that indicates security alerts assigned to the respective stages of the cyberattack.

13. The method of claim 8, wherein:
the SAMA system is configured to repeat the meta-analysis to identify sub-graphs of causally-related security alerts in individual time periods; and
the method further comprises the SAMA system:
receiving user input indicating to monitor a particular sub-graph identified in a first time period for additional time periods;
monitoring the particular sub-graph according to the user input, wherein the monitoring augments the particular sub-graph with additional causally related security alerts observed in the additional time periods; and
reporting the particular sub-graph including the additional causally related security alerts via the user interface.

14. The method of claim 8, further comprising the SAMA system:
receiving a user query via the user interface specifying a graph search starting from one or more selected vertices in the sub-graph; and responsive to the user query, updating the user interface to provide additional causally related security alerts and associated entities found based on the graph search.

15. A method of claim 7, wherein identifying the sub-graph comprises:
calculating edge weights for edges in the security data graph, wherein an edge weight for a given edge reflects odds of the given edge being due to an attack activity versus a benign activity;
filtering the edges in the security data graph using the edge weights and a weight threshold; and
identifying a group of connected vertices as the sub-graph, wherein the group is connected with edges that remain after the filtering.

16. The method of claim 15, wherein:
the edge weights are calculated based at least on historical graph statistics of previous security data graphs of the computing environment; and
the historical graph statistics are maintained by a statistical model and updated periodically to reflect changes in the computing environment.

17. The method of claim 7, wherein the report includes an attack chain view that organizes the causally related security alerts into a plurality of attack stages.

18. One or more non-transitory computer-readable storage media storing program instructions that when executed on or across one or more processors implement a security alert meta-analysis (SAMA) system and cause the SAMA system to:
receive security data about a computing environment that includes a first type of monitoring service that generates a first type of security alert about the computing environment of networked computing resources and a second type of monitoring service that generates a second type of security alert about the computing environment of networked computing resources,
wherein the first type of monitoring service and the second type of monitoring service independently collect security data from at least one or more data collecting agents or sensors operating in the computing environment,
wherein the first type of security alert and the second type of security alert is generated after the first and second types of monitoring services independently perform a first-tier analysis of the independently collected security data, and the analysis identifies an event or condition in the computing environment;
perform a meta-analysis of the first and second types of security alerts generated by the first and second types of monitoring services, including to:
generate a security data graph from the security data, wherein the security data graph contains (a) a first set of vertices that represent entities observed in the security data, (b) a second set of vertices that represent the security alerts, (c) a first set of edges that represent actions or relationships among the entities, and (d) a second set of edges that indicate entities involved in the security alerts generated by the first and second types of monitoring services, wherein the entities include different types of resources, accounts, or observations in the computing environment; and
identify at least one sub-graph of the security data graph, where the sub-graph connects a group of causally related security alerts that evidence a cyberattack on the computing environment and entities associated with the causally related security alerts; and generate, via a user interface, a report that indicates the group of causally related security alerts and associated entities as evidence of the cyberattack, wherein the report reduces a number of false positives in the security alerts generated by the first and second types of security monitoring services.

19. The one or more non-transitory computer-readable storage media of claim 18, wherein the report includes an attack chain view that organizes the causally related security alerts into a plurality of attack stages.

20. The one or more non-transitory computer-readable storage media of claim 18, wherein the program instructions when executed on or across one or more processors cause the SAMA system to:

store the security data graph in a distributed graph database; and schedule a data analytics job to perform the meta-analysis on the security data graph, wherein the data analytics job is executed by a cluster of compute nodes to process respective portions of the security data graph in parallel.

* * * * *